United States Patent
Chen et al.

(10) Patent No.: US 12,531,841 B2
(45) Date of Patent: Jan. 20, 2026

(54) ACCESS CONTROL METHOD, CLIENT PROXY APPARATUS, GATEWAY DEVICE, AND RELATED SYSTEM

(71) Applicant: HUAWEI TECHNOLOGIES CO., LTD., Shenzhen (CN)

(72) Inventors: Lijian Chen, Hangzhou (CN); Hao Wu, Hangzhou (CN); Rui Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 18/426,801

(22) Filed: Jan. 30, 2024

(65) Prior Publication Data

US 2024/0171555 A1 May 23, 2024

Related U.S. Application Data

(63) Continuation of application No. PCT/CN2022/079432, filed on Mar. 4, 2022.

(30) Foreign Application Priority Data

Jul. 31, 2021 (CN) .......................... 202110876797.1
Sep. 3, 2021 (CN) .......................... 202111029935.9

(51) Int. Cl.
*H04L 9/40* (2022.01)
*H04L 67/06* (2022.01)
(Continued)

(52) U.S. Cl.
CPC ........ *H04L 63/0435* (2013.01); *H04L 63/029* (2013.01); *H04L 63/166* (2013.01); *H04L 63/30* (2013.01)

(58) Field of Classification Search
CPC . H04L 63/0435; H04L 63/029; H04L 63/166; H04L 63/30; H04L 63/0272;
(Continued)

(56) References Cited

U.S. PATENT DOCUMENTS 10,091,239 B2* 10/2018 Ylonen ................ H04L 63/164
10,353,962 B2* 7/2019 Choen .................... H04L 65/80
(Continued)

FOREIGN PATENT DOCUMENTS

| CN | 111885031 A | 11/2020 |
| JP | 2007520797 A | 7/2007 |
| KR | 102204705 B1 | 1/2021 |

OTHER PUBLICATIONS

Japanese Office Action issued in corresponding Japanese Patent Application No. 2024-505506, dated Sep. 10, 2024, pp. 1-3.
(Continued)

*Primary Examiner* — Darren B Schwartz
(74) *Attorney, Agent, or Firm* — HAUPTMAN HAM, LLP

(57) ABSTRACT

An access control method, performed by a client proxy apparatus running on a terminal device, includes intercepting a first negotiation packet. The first negotiation packet is from a first application client on the terminal device and is used to perform negotiation to establish a first session. The first session is between the first application client and a first server. The first session meets an encryption strength requirement. The method also includes adding authentication information corresponding to the first application client to a transport layer packet header of the first negotiation packet to obtain a modified first negotiation packet. The method further includes sending the modified first negotiation packet to a gateway device.

24 Claims, 16 Drawing Sheets

(51) Int. Cl.
*H04L 67/141* (2022.01)
*H04L 67/564* (2022.01)
*H04L 69/22* (2022.01)

(58) Field of Classification Search
CPC ............. H04L 63/0428; H04L 63/0281; H04L 63/205; H04L 69/22; H04L 67/06; H04L 67/141; H04L 9/40; H04L 67/56
See application file for complete search history.

(56) References Cited

U.S. PATENT DOCUMENTS

| | | | | |
|---|---|---|---|---|
| 2004/0083295 | A1* | 4/2004 | Amara | H04L 12/4633 709/229 |
| 2015/0326539 | A1* | 11/2015 | Sharma | H04L 9/083 713/168 |
| 2018/0096128 | A1* | 4/2018 | Hiramatsu | G06F 21/43 |
| 2018/0139191 | A1* | 5/2018 | Shi | H04L 63/123 |
| 2018/0234388 | A1* | 8/2018 | Reddy | H04L 63/061 |
| 2019/0116127 | A1* | 4/2019 | Pismenny | H04L 63/0272 |
| 2019/0124054 | A1* | 4/2019 | Zhang | G06F 21/60 |
| 2019/0173860 | A1* | 6/2019 | Sankaran | H04L 9/3273 |
| 2019/0182250 | A1* | 6/2019 | Kiester | H04L 63/0428 |
| 2020/0186507 | A1* | 6/2020 | Dhanabalan | H04L 63/0272 |
| 2022/0247718 | A1 | 8/2022 | Kim et al. | |

OTHER PUBLICATIONS

International Search Report issued in corresponding International Application No. PCT/CN2022/079432, dated May 26, 2022, pp. 1-11.

Extended European Search Report issued in corresponding European Application No. 22851566.4, dated Aug. 26, 2024, pp. 1-11.

* cited by examiner

FIG. 2

```
CONNECT tcp:10.19.13.181:7788 HTTP/1.1
Host:10.19.13.181:7788
Accept: */*
Cookie: SDP_SESSIONID=cae7-65d5b2f3971701b5eee4-; appid=aef7-a18534f3971bdcbea25-; servername=
```

ACCESS CONTROL METHOD, CLIENT PROXY APPARATUS, GATEWAY DEVICE, AND RELATED SYSTEM

CROSS-REFERENCE TO RELATED APPLICATIONS

This application is a continuation of International Application No. PCT/CN2022/079432, filed on Mar. 4, 2022, which claims priority to Chinese Patent Application No. 202110876797.1, filed on Jul. 31, 2021, and Chinese Patent Application No. 202111029935.9, filed on Sep. 3, 2021. All of the aforementioned patent applications are hereby incorporated by reference in their entireties.

TECHNICAL FIELD

This application relates to the field of computer network technologies, and in particular, to an access control method, a client proxy apparatus, a gateway device, and an access control system.

BACKGROUND

A zero-trust architecture (also referred to as a "zero-trust security model") is different from a conventional network border security trust system. The zero-trust architecture emphasizes a principle of "never trust and always verify". In other words, a gateway device should not trust terminal devices by default, regardless of whether the terminal devices are connected through a local area network of a company or have been verified. Link security is an important aspect in the zero-trust architecture, and means that data in a session established between the terminal device and a server that provides a resource needs to be encrypted for transmission, to avoid a security problem caused by network sniffing.

In the zero-trust architecture, each session further needs to carry authentication information while ensuring the link security, so that the gateway device performs authentication based on the authentication information carried in the session, and determines whether the session currently requested to be established has corresponding resource access permission. This allows or blocks establishing the session between the terminal device and the server.

The terminal device may transmit the authentication information to the gateway device through an application layer field of a packet. For example, in a browser/server (B/S) scenario, the terminal device carries the authentication information in a cookie field of a Hypertext Transfer Protocol (HTTP) packet by setting small data (cookie) downloaded from a browser to a terminal. However, in a client/server (C/S) scenario, an application form is very rich and complex. If the authentication information needs to be transmitted through application layer data of the packet, adaptation and modification need to be respectively performed on a plurality of application protocols on the terminal device and a gateway, which is difficult to implement.

To shield differences between various applications, research proposes to establish a tunnel between the terminal device and the gateway device, and the terminal device carries the authentication information through a tunnel header encapsulated in the packet. However, in this solution, an additional tunnel needs to be established between the terminal device and the gateway device. The terminal device performs tunnel encapsulation on all application packets, and the gateway device needs to perform decapsulation on all tunnel packets. Because tunnel-related encapsulation and decapsulation processes, and encryption and decryption that may be involved consume a lot of processing resources, high performance overheads are caused to both the terminal device and the gateway device.

SUMMARY

Embodiments of this application provide an access control method, to alleviate a problem of high performance overheads of a terminal device or a gateway device in an access control process in a zero trust scenario.

According to a first aspect, an access control method is provided, and is performed by a client proxy apparatus running on a terminal device. The client proxy apparatus intercepts a first negotiation packet, where the first negotiation packet is from a first application client on the terminal device and is used to perform negotiation to establish a first session, the first session is a session between the first application client and a first server, and the first session meets an encryption strength requirement. The client proxy apparatus adds authentication information corresponding to the first application client to a transport layer packet header of the first negotiation packet, to obtain a modified first negotiation packet: and sends the modified first negotiation packet to a gateway device.

In embodiments of this application, for a session that is initiated by an application client on the terminal device and that meets the encryption strength requirement, before forwarding a session negotiation packet to the gateway device, the client proxy apparatus running on the terminal device does not need to further perform encrypted tunnel encapsulation, but carries authentication information in a transport layer packet header of the session negotiation packet. In this way, in a case that requirements for link security and authentication are met, overheads caused by additional tunnel encryption and decryption are reduced, and processing performance of the terminal device and the gateway device is improved.

Optionally, in a possible implementation, the client proxy apparatus determines, based on a protocol type of the intercepted session negotiation packet, carried information related to encryption strength, and the like, whether the negotiated session meets the encryption strength requirement. The information related to the encryption strength carried in the session negotiation packet includes but is not limited to a protocol version number and/or a cipher suite identifier list.

For example, that the first session meets an encryption strength requirement includes:

The first negotiation packet carries a specified protocol version number, where transmission security of implementation of a protocol version corresponding to the specified protocol version number is higher than a preset security standard, and data transmission is performed by using the first session based on the protocol version. For example, the specified protocol version number includes transport layer security (TLS) 1.2 or TLS 1.3.

For another example, that the first session meets an encryption strength requirement includes:
the first negotiation packet includes a specified cipher suite identifier, where the specified cipher suite identifier identifies a specified cipher suite, transmission security implemented by the specified cipher suite is higher than the preset security standard, and application data in the first session is encrypted based on the specified cipher suite.

Embodiments of this application provide a manner of determining, based on the information carried in the session negotiation packet, that the first session meets the encryption strength requirement. This manner is simple and effective.

Optionally, in a possible implementation, the first negotiation packet is a TLS packet. For example, the first negotiation packet is a client hello message.

Optionally, in a possible implementation, for a packet received from the client proxy apparatus, the gateway device needs to perform different subsequent processing in different cases. For example, if the received packet is a packet multiplexed by the client proxy apparatus after the authentication information is added to the transport layer packet header of the negotiation packet sent by the application client, because the packet is not encapsulated, the gateway device does not need to perform decapsulation on the packet. To facilitate processing by the gateway device, a transport layer packet header of the modified first negotiation packet further includes indication information, and the indication information enables the gateway device to skip performing decapsulation on the modified first negotiation packet.

Optionally, the client proxy apparatus selectively adds the authentication information to different positions of the transport layer packet header of the first negotiation packet. In a possible implementation, the client proxy apparatus adds the authentication information to a transport layer security option (TLS option) in the transport layer packet header. For example, the adding authentication information corresponding to the first application client to a transport layer packet header of the first negotiation packet includes: adding a TLS option field to the transport layer packet header of the first negotiation packet: and including, in the TLS option field, the authentication information corresponding to the first application client.

Optionally, in a possible implementation, the TLS option field conforms to a type-length-value (TLV) structure, a type T field in the TLV structure is used to carry indication information, the indication information is used to enable the gateway device to skip performing TLS decapsulation processing on the modified session negotiation packet, and the value V field is used to carry the authentication information. According to the structure of the TLS option field provided in embodiments of this application, the TLS option field may carry both the indication information and the authentication information, which is an efficient information carrying manner.

Optionally, in a possible implementation, the authentication information includes a user token and/or an application token. The authentication information is used by the gateway device to authenticate an identity of an access initiator in each session establishment process.

Optionally, in a possible implementation, the authentication information further includes: a device identifier and/or address information of the first server. For example, the address information of the first server includes an internet protocol (IP) address and/or a port number of the first server.

Optionally, in a possible implementation, before sending the modified first negotiation packet, the method further includes:
  modifying a sequence number of the first negotiation packet based on a first difference and a length value of the TLS option field, and modifying an acknowledgment number of the first negotiation packet based on a second difference, to obtain the modified first negotiation packet, where the first difference is a difference between a sequence number of a synchronization packet sent by the client proxy apparatus serving as a proxy client to the first server and a sequence number of a synchronization packet sent by the first client, and the second difference is a difference between an acknowledgment number of the synchronization packet sent by the client proxy apparatus serving as the proxy client to the first server and an acknowledgment number of the synchronization packet sent by the first client.

Because the client proxy apparatus adds the authentication information to the first negotiation packet, a packet length of the modified first negotiation packet is changed compared with a packet length before the modification. To reduce an error rate when the gateway device parses the modified first negotiation packet, the client proxy apparatus further modifies the sequence number of the first negotiation packet when adding the authentication information to the first negotiation packet.

Optionally, in a possible implementation, after the sending the modified first negotiation packet to a gateway device, the method further includes:
  after the first session is successfully established, transmitting a subsequent packet of the first session in a stream mode.

In embodiments of this application, the client proxy apparatus forwards a packet in a proxy mode before the first session is successfully established, and after the first session is successfully established, switches from the proxy mode to the stream mode to transmit the subsequent packet of the first session. Compared with the proxy mode, in the stream mode, the client proxy apparatus does not need to maintain two independent connection states. Therefore, processing resources on the client proxy apparatus may be further saved, and processing resources of the terminal device may be saved.

Optionally, in a possible implementation, the transmitting a subsequent packet of the first session in a stream mode includes:
  modifying a sequence number of the subsequent packet of the first session from the first application client based on a first difference, and modifying an acknowledgment number of the subsequent packet of the first session from the first application client based on a second difference, to obtain a modified subsequent packet of the first session from the first application client, where the first difference is a difference between a sequence number of a synchronization packet sent by the client proxy apparatus serving as a proxy client to the first server and a sequence number of a synchronization packet sent by the first client, and the second difference is a difference between an acknowledgment number of the synchronization packet sent by the client proxy apparatus serving as the proxy client to the first server and an acknowledgment number of the synchronization packet sent by the first client;
  sending the modified subsequent packet of the first session from the first application client to the gateway device;
  modifying the sequence number of the subsequent packet of the first session from the gateway device based on a third difference, and modifying the acknowledgment number of the subsequent packet of the first session from the gateway device based on a fourth difference and a length value of the TLS option field, to obtain the modified subsequent packet of the first session from the gateway device, where the third difference is a difference between a sequence number of a synchronization acknowledgment packet sent by the client proxy apparatus serving as a proxy server to the first client and a sequence number of a synchronization acknowledgment packet sent by the first server, and the fourth difference is a difference between an acknowledgment number of a synchronization acknowledgment packet sent by the client proxy apparatus serving as a proxy server to the first client and an acknowledgment number of a synchronization acknowledgment packet sent by the first server: and sending the modified subsequent packet of the first session that is from the gateway device to the gateway device.

Optionally, in a possible implementation, the method further includes:

intercepting a second negotiation packet, where the second negotiation packet is from a second application client on the terminal device and is used to negotiate with a second server to establish a second session, and the second session does not meet the encryption strength requirement;

performing tunnel encapsulation on the second negotiation packet to obtain a tunnel negotiation packet, where a packet header of the tunnel negotiation packet includes authentication information corresponding to the second application client, and the tunnel negotiation packet is used to perform negotiation to establish an encrypted tunnel between the client proxy apparatus and the gateway device: and sending the tunnel negotiation packet to the gateway device.

According to the access control method provided in embodiments of this application, as a supplement to a processing process of the session that is initiated by the application client and that meets the encryption strength requirement, for a session that is initiated by the application client on the terminal device and that does not meet the encryption strength requirement, the client proxy apparatus needs to establish an additional encrypted tunnel between the client proxy apparatus and the gateway device. The client proxy apparatus encapsulates a session packet through the encrypted tunnel to meet a link security requirement. In addition, the authentication information is transferred to the gateway device through the tunnel packet header added by the client proxy apparatus to the session negotiation packet, to meet an authentication requirement. In this way, a more complete solution is provided, so that the client proxy apparatus on the terminal device may process various sessions initiated by various application clients.

Optionally, the authentication information corresponding to the second application client is carried at different positions of a packet header of the tunnel negotiation packet. In a possible implementation, the authentication information corresponding to the second application client is carried in an application layer packet header of the tunnel negotiation packet. In another implementation, the authentication information corresponding to the second application client is carried in a transport layer packet header of the tunnel negotiation packet.

Optionally, in a possible implementation, the application layer packet header is a hypertext transfer protocol HTTP header, and the authentication information corresponding to the second application client is carried in a cookie field of the HTTP header.

Optionally, in a possible implementation, after the sending a tunnel negotiation packet to the gateway device, the method further includes:

after the encrypted tunnel is successfully established, transmitting a subsequent packet of the second session through the encrypted tunnel.

For a session that is initiated by an application client on a terminal device and that does not meet an encryption strength requirement, the client proxy apparatus transmits a subsequent packet of the session through an encrypted tunnel between the client proxy apparatus and the gateway device, to meet a link security requirement.

According to a second aspect, embodiments of this application provide an access control method. A gateway device receives a first negotiation packet, where the first negotiation packet is from a first client proxy apparatus and is used to perform negotiation to establish a first session. The first session is a session between a first terminal device and a first server, and is, for example, a session between a first application client on the first terminal device and the first server. The first client proxy apparatus runs on the first terminal device, and a transport layer packet header of the first negotiation packet carries authentication information. The first negotiation packet received by the gateway device is actually a first negotiation packet modified by the client proxy apparatus in the first aspect. The gateway device initiates first authentication based on the authentication information. After the first authentication succeeds, the gateway device skips performing tunnel decapsulation on the first negotiation packet, and forwards the first negotiation packet to the first server, to establish a first connection, where the first connection is a connection between the gateway device and the first server.

When a transport layer packet header of the received session negotiation packet carries the authentication information, and when authentication succeeds based on the authentication information carried in the transport layer packet header, the gateway device forwards the session negotiation packet to a server without performing decapsulation on the session negotiation packet. Because tunnel decapsulation is not performed, overheads caused by additional tunnel encryption and decryption are reduced, and processing performance of the terminal device and the gateway device is improved.

Optionally, in a possible implementation of the second aspect, the first negotiation packet is a TLS packet. For example, the first negotiation packet is a Client Hello message.

Optionally, in a possible implementation of the second aspect, the authentication information is carried in a transport layer security option TLS option field of the transport layer packet header of the first negotiation packet.

Optionally, in a possible implementation of the second aspect, the transport layer packet header further carries indication information, and the indication information enables the gateway device to skip performing tunnel decapsulation on the first negotiation packet.

Optionally, in a possible implementation of the second aspect, the TLS option field conforms to a type-length-value TLV structure, a type T field in the TLV structure is used to carry the indication information, the gateway device skips performing TLS decapsulation on the modified session negotiation packet based on the indication information, and the value V field is used to carry the authentication information.

Optionally, in a possible implementation of the second aspect, the method further includes:

after the first authentication succeeds, successfully establishing a second connection, where the second connection is a connection between the gateway device and the first client proxy apparatus;

receiving, through the second connection, a subsequent packet of the first session that is sent by the first client proxy apparatus, and forwarding the subsequent packet of the first session from the first client proxy apparatus to the first server through the first connection: and receiving the subsequent packet of the first session from the first server through the first connection: and forwarding the subsequent packet of the first session from the first server to the first client proxy apparatus through the second connection.

When the gateway device successfully authenticates a session initiator, the gateway device transmits a session packet between an application client on the terminal device and the server through a connection between the gateway device and the first client proxy apparatus and a connection between the gateway device and the server. This implements access control at a session granularity.

Optionally, in a possible implementation of the second aspect, the method further includes: If the first authentication fails, the gateway device terminates establishing the second connection.

Optionally, in a possible implementation of the second aspect, the method further includes:

receiving a second negotiation packet, where the second negotiation packet is from a second client proxy apparatus and is used to perform negotiation to establish a second session, the second session is a session between a second terminal device and a second server, the second client proxy apparatus runs on the second terminal device, and a transport layer packet header of the second negotiation packet does not carry authentication information;

obtaining the authentication information from an application layer packet header of the second negotiation packet, and initiating second authentication based on the authentication information obtained from the application layer packet header of the second negotiation packet; and performing access control on the second session based on an authentication result of the second authentication.

According to the access control method provided in embodiments of this application, after receiving the session negotiation packet, the gateway device performs different subsequent processing processes based on different positions at which the authentication information is obtained. As a supplement to a processing process of a session that is initiated by the application client and meets an encryption strength requirement, when the transport layer packet header of the received session negotiation packet does not carry the authentication information, the gateway device obtains the authentication information from the application layer packet header, to initiate authentication. When authentication succeeds, link security needs to be implemented between the gateway device and the client proxy apparatus through an encrypted tunnel. Therefore, when performing packet forwarding, the gateway device needs to perform tunnel encapsulation or decapsulation on a packet transmitted between the gateway device and the client proxy apparatus.

Optionally, in a possible implementation of the second aspect, the performing access control on the first session based on an authentication result of the first authentication process includes:

if the second authentication succeeds, performing tunnel decapsulation on the second negotiation packet, and sending a packet obtained through decapsulation to the second server, to establish a third connection, where the third connection is a connection between the gateway device and the second server;

establishing an encrypted tunnel between the gateway device and the second client proxy apparatus; and transmitting a subsequent packet of the second session through the encrypted tunnel and the third connection.

Optionally, in a possible implementation of the second aspect, the performing access control on the second session based on an authentication result of the second authentication includes:

if the second authentication fails, terminating establishing the encrypted tunnel with the second client proxy apparatus.

According to a third aspect, embodiments of this application provide a client proxy apparatus. The client proxy apparatus runs on a terminal device, the apparatus includes a plurality of functional modules, and the plurality of functional modules interact with each other, to implement the method in the first aspect and implementations of the first aspect. Optionally, the plurality of functional modules are implemented based on software, hardware, or a combination of software and hardware, and the plurality of functional modules are randomly combined or divided based on a specific implementation.

According to a fourth aspect, embodiments of this application provide a gateway device. The gateway device includes a plurality of functional modules, and the plurality of functional modules interact with each other, to implement the method in the first aspect and implementations of the first aspect. Optionally, the plurality of functional modules are implemented based on software, hardware, or a combination of software and hardware, and the plurality of functional modules are randomly combined or divided based on a specific implementation.

According to a fifth aspect, embodiments of this application provide a terminal device, including a memory and a processor, where the memory is configured to store computer instructions; and after the computer instructions are read by the processor, the terminal device is enabled to perform the method according to the first aspect or any possible implementation of the first aspect.

According to a sixth aspect, embodiments of this application provide a gateway device, including a memory and a processor, where the memory is configured to store computer instructions: and after the computer instructions are read by the processor, the gateway device is enabled to perform the method according to the second aspect or any possible implementation of the second aspect.

According to a seventh aspect, embodiments of this application provide a computer-readable storage medium. The computer-readable storage medium stores computer instructions. When the computer instructions are executed by a processor of a terminal device, the terminal device is enabled to perform the access control method according to the first aspect or any possible implementation of the first aspect. Alternatively, when the computer instructions are executed by a processor of a gateway device, the gateway device is enabled to perform the method according to the second aspect or any possible implementation of the second aspect.

According to an eighth aspect, embodiments of this application provide an access control system, including a terminal device and a gateway device, where a client proxy apparatus runs in the terminal device, the client proxy apparatus is configured to intercept a first negotiation packet, where the first negotiation packet is from a first application client on the terminal device and is used to perform negotiation to establish a first session, the first session is a session between the first application client and a first server, and the first session meets an encryption strength requirement: add authentication information corresponding to the first application client to a transport layer packet header of the first negotiation packet, to obtain a modified first negotiation packet: and send the modified first negotiation packet to a gateway device.

The gateway device is configured to receive the modified first negotiation packet; initiate first authentication based on the authentication information carried in the transport layer packet header of the modified first negotiation packet: and after the first authentication succeeds, skip performing tunnel decapsulation on the first negotiation packet, and forward the first negotiation packet to the first server, to establish a first connection, where the first connection is a connection between the gateway device and the first server.

According to a ninth aspect, a chip is provided. The chip includes a programmable logic circuit and/or program instructions. When the chip runs, actions performed by the client proxy apparatus in the method according to the first aspect and implementations of the first aspect are implemented.

According to a tenth aspect, a chip is provided. The chip includes a programmable logic circuit and/or program instructions. When the chip runs, actions performed by the gateway device in the method in the second aspect and implementations of the second aspect are implemented.

According to an eleventh aspect, a computer program product is provided, where the computer program product includes one or more computer program instructions: and when the computer program instructions are loaded and run by a terminal device, the terminal device is enabled to perform actions performed by the terminal device in the method according to the first aspect and implementations of the first aspect.

According to a twelfth aspect, a computer program product is provided, where the computer program product includes one or more computer program instructions: and when the computer program instructions are loaded and run by a gateway device, the gateway device is enabled to perform actions performed by the gateway device in the method in the second aspect and implementations of the second aspect.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application, and a person of ordinary skill in the art may still derive other drawings from these accompanying drawings without creative efforts.

FIG. 2 is a schematic diagram of carrying authentication token information through a cookie in a B/S scenario according to an embodiment of this application:

FIG. 5 is a schematic diagram of carrying authentication information through an HTTP application layer packet header according to an embodiment of this application:

FIG. 8 is a schematic diagram of a parsing result of a Client Hello message according to an embodiment of this application:

DESCRIPTION OF EMBODIMENTS

Figure 1:
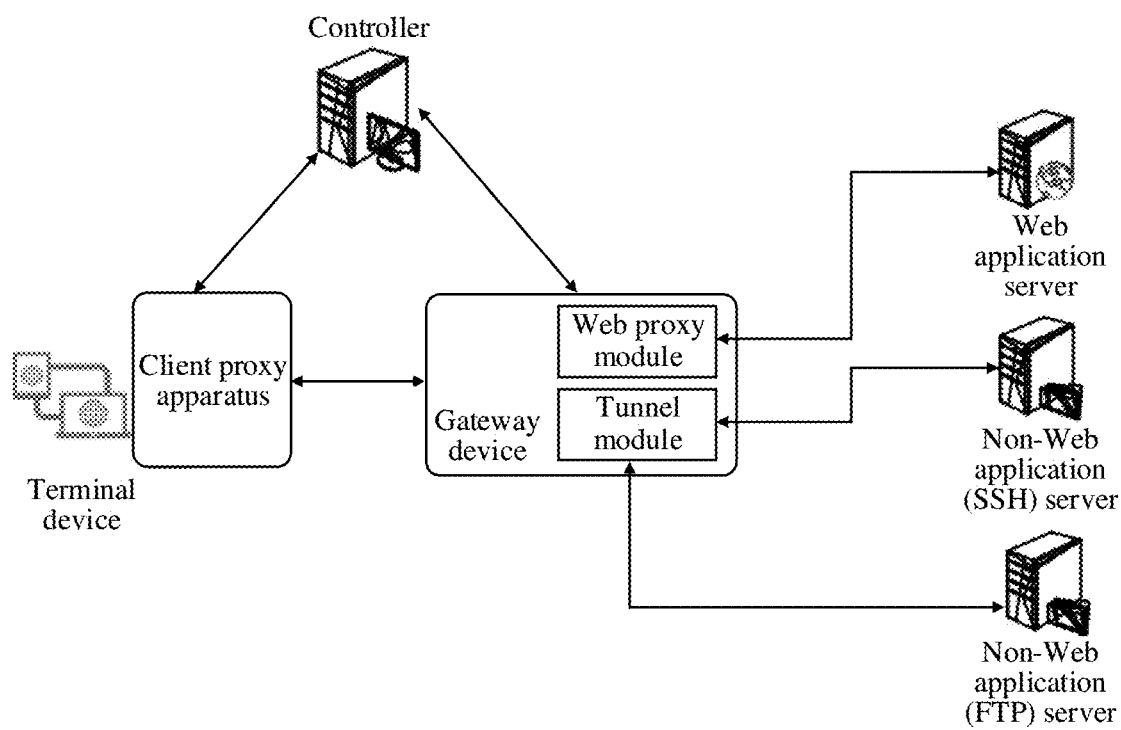
FIG. 1 is a schematic diagram of an access control system in a zero trust architecture according to an embodiment of this application.

As shown in FIG. 1, an access control system based on a zero trust architecture usually includes a controller, a gateway device, and a terminal device, where a client proxy apparatus is installed in the terminal device. When the terminal device needs to access a protected application resource, the client proxy apparatus first initiates identity authentication and an access control request to the controller, and after the identity authentication and the access control succeed, the controller sends token information to the client proxy apparatus. Then, the client proxy apparatus sends an access request to the gateway device, and carries authentication information including the token information in the access request. The gateway device authenticates an access initiator based on the authentication information in the access request. If the authentication succeeds, the gateway device establishes a connection to a server to transmit a subsequent service packet between the client proxy apparatus and the server: otherwise, the gateway device closes a connection to the client proxy apparatus.

In different scenarios, the client proxy apparatus needs to resolve a problem of how to transfer the authentication information to the gateway device, so that the gateway device identifies whether a current session has corresponding resource access permission by using the authentication information.

As shown in FIG. 1, in a B/S scenario, a browser on the terminal device is used as an application client to access a Web application. In this scenario, as shown in FIG. 2, the client proxy apparatus carries token information in a cookie field of an HTTP protocol header by setting a browser cookie.

As shown in FIG. 1, different from the B/S scenario, application forms in a C/S scenario are very rich and complex. For example, plaintext applications by using a file transfer protocol (FTP) application, a Telnet application, a secure shell (SSH) protocol application, and a remote desktop protocol (RDP) application as an example: encryption applications by using a file transfer protocol via secure socket layer (FTPS) and Web sockets as an example: and proprietary protocol applications by using desktop cloud interconnection and a mini program as an example. If the authentication information is to be carried in an application layer packet header of a packet, a plurality of application protocols need to be adapted and modified on the terminal device. Correspondingly, the gateway device also needs to perform corresponding adaptation and modification on a protocol layer, so that the gateway device may parse and identify the authentication information carried in the packet sent by the terminal device. Therefore, this solution is difficult to implement and is impractical.

In view of a problem of high implementation difficulty of the solution of transmitting the authentication information through protocol layer adaptation, research proposes that if a tunnel is established between a client and a zero trust gateway, the authentication information is encapsulated in a packet header of a tunnel packet. In this way, protocol layer adaptation does not need to be performed for different applications, and token information used for authentication may also be transferred. After obtaining a service packet from the application client that belongs to the same terminal device, the client proxy apparatus initiates a tunnel establishment process with the gateway device, and encapsulates the authentication information into the tunnel (the following describes in detail how to carry the authentication information for different tunnels). When obtaining a tunnel packet, the gateway device first performs decapsulation on the tunnel packet header, extracts related authentication information from the tunnel packet header, and performs authentication on the related authentication information. If the authentication fails, the gateway device blocks the service traffic. If the authentication succeeds, the gateway device establishes a connection to a server that provides resources (the server that provides the resources is also referred to as a "real server", which is relative to a proxy server. The zero-trust gateway maps a virtual IP address as one proxy server, to establish a connection to the terminal device by replacing the real server), performs decapsulation on the tunnel traffic, and sends the decapsulated service packet to the server that provides resources. The foregoing process meets requirements of link security and real-time authentication in the C/S scenario.

Figure 3:
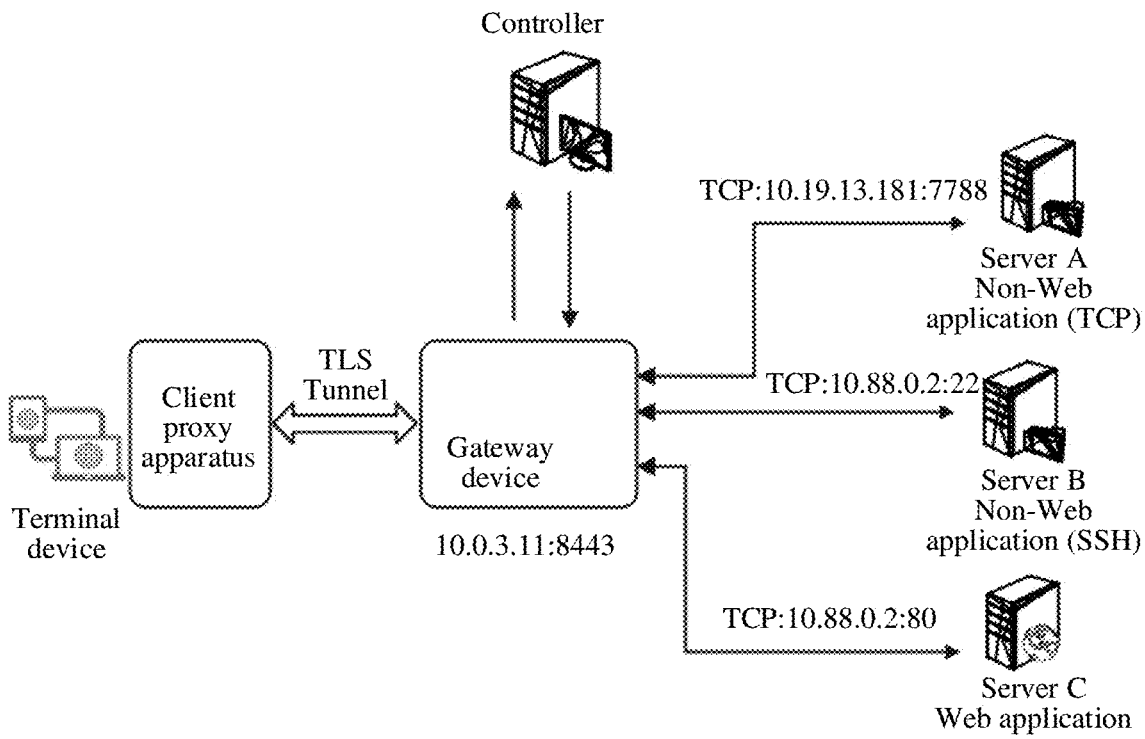
FIG. 3 is a schematic diagram of transmitting authentication information between a client proxy apparatus and a gateway device through a TLS tunnel according to an embodiment of this application.

FIG. 3 describes a solution in which authentication information is transferred between a client proxy apparatus and a gateway device through a TLS tunnel. It is assumed that there are three servers in a protected network. A server A provides a TCP service through a port 7788 on an IP address 10.19.13.181, a server B provides an SSH service through a port 22 on an IP address 10.88.0.2, and a server C provides a Web service through a port 80 on the IP address 10.88.0.2. According to a configuration of a controller, the foregoing three services are mapped to a port 8443 on a virtual IP address 10.0.3.11 of the gateway device. Before a terminal device accesses various applications, the client proxy apparatus obtains, from the controller by initiating identity authentication and an access control process, a mapped virtual IP address and a port of each service that the terminal device and a user are allowed to access, and an address and a port number of a corresponding real server.

After intercepting service packets sent by various applications running on the terminal device, the client proxy apparatus initiates establishing a TLS Tunnel with the gateway device. The client proxy apparatus carries token information and real server information that are used for authentication in a TLS extension option of a first TLS handshake packet Client Hello. For example, a TLS extension type is defined as 2000 (the extension type is not in a default TLS option). After being parsed, the carried data content is as follows:

```
json_content:
{
"cmd": "open",            #Bypass request
"time": "1612350008",     #Timestamp of a unix operating system
"user_token": "xxx",      #User token
"app_token": "yyy",       #Application token
"terminal_id": "zzz"      #Identifier (ID) of a terminal device
"terminal_ip": "10.0.3.10", #IP address of a terminal device
"rserver_info":           #IP address and/or port number of a real
"10.80.0.2:22",
server (Port)
}
```

The gateway device extracts related authentication information to perform authentication, to determine whether the terminal device is allowed to access a service provided by a port 22 on an IP address 10.80.0.2 carried in a TLS option field. If the authentication fails, a current session between the gateway device and the client proxy apparatus is closed. If the authentication succeeds, the gateway device initiates a connection to the real server based on the information (namely, the IP address 10.80.0.2 and the port number 22) of the real server obtained from the TLS option. Then, the gateway device completes a TLS tunnel establishment process with the client proxy apparatus, performs TLS decapsulation and decryption on a tunnel packet subsequently received through a TLS tunnel, and forwards a service packet obtained through decapsulation and decryption to the real server.

Figure 4:
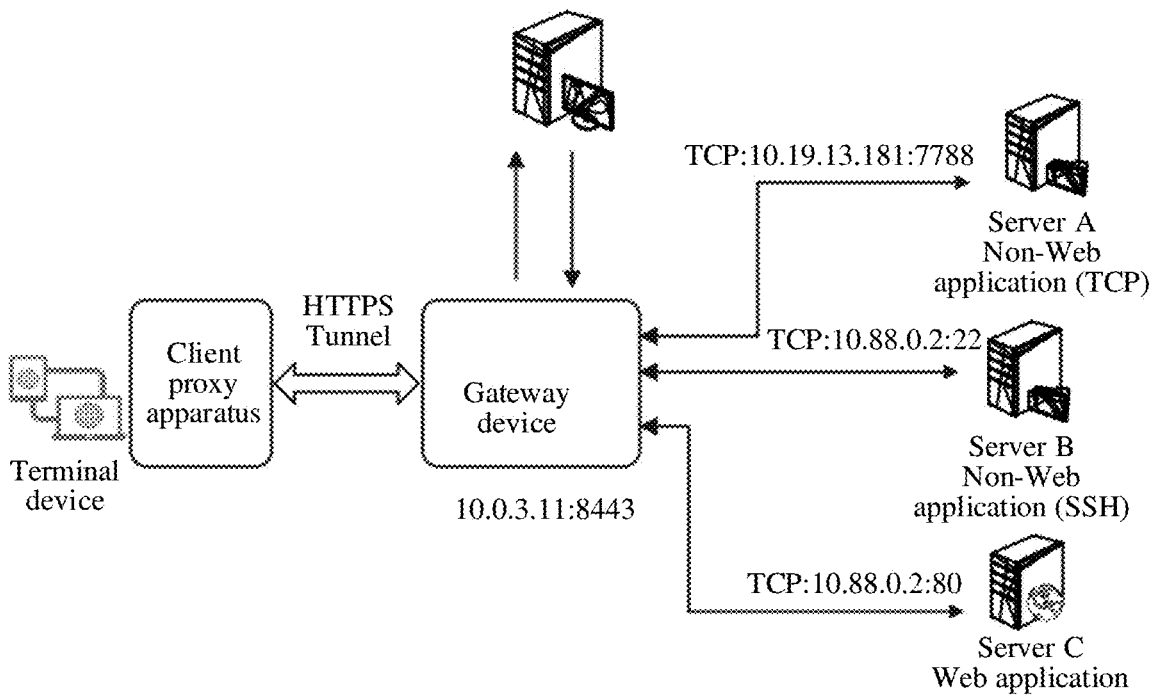
FIG. 4 is a schematic diagram of transmitting authentication information between a client proxy apparatus and a gateway device through an HTTPS tunnel according to an embodiment of this application.

FIG. 4 describes a solution in which token information is transferred between a client proxy apparatus and a gateway device through an HTTPS tunnel. An application scenario is similar to the application scenario in FIG. 3. For details, refer to the description in FIG. 3. After the client proxy apparatus intercepts a service packet sent by an application running on a terminal device, the client proxy apparatus initiates an HTTPS tunnel establishment process with the gateway device. HTTPS is also referred to as HTTP over TLS/SSL. The client proxy apparatus carries related information of a real server in a uniform resource identifier (URI) field of a Connect method of an HTTP application layer. As shown in FIG. 5, for example, content of a Connect field carries an IP address 10.19.13.181, a port number 7788, and an open service protocol TCP of a real server currently accessed by the terminal device. The client proxy apparatus carries token information in a Cookie field. The token information includes an application token "aef7-a18534f3971bdcbea25-" and/or user token information (not shown in the figure), and the like.

The gateway device uses a protocol parsing procedure similar to a protocol parsing procedure in a B/S scenario, to obtain token information carried in a packet header of an HTTPS tunnel packet, and performs token authentication, to determine whether to allow the terminal device to access a TCP service provided by the port 7788 on the IP address 10.19.13.181 carried in the Connect field. If the authentication fails, a current session between the gateway device and the client proxy apparatus is closed. If the token authentication succeeds, a connection to the real server is initiated based on the information (namely, the IP address 10.19.13.181 and the port number 7788) of the real server carried in the Connect field. An HTTPS tunnel establishment process with the client is completed, a tunnel packet subsequently received through the HTTPS tunnel is decapsulated and decrypted, and the decapsulated and decrypted service packet is forwarded to the real server.

In the solution shown in FIG. 3 or FIG. 4, in a C/S scenario, the client proxy apparatus needs to establish a new tunnel connection to the gateway device. The client proxy apparatus needs to encapsulate a to-be-sent service packet, and the gateway device needs to perform decapsulation on the to-be-sent service packet. However, encryption and decryption involved in a TLS tunnel or an HTTPS tunnel of the client proxy apparatus are very performance-consuming. If an application to be accessed by an application client on the terminal device is an encryption protocol and meets a strong encryption requirement, for example, an FTPS protocol is already TLS encryption, TLS tunnel encapsulation or HTTPS tunnel encapsulation is not required in this case. For the client proxy apparatus, creating a tunnel increases performance overheads: and for the gateway device, parallel processing is performed on a tunnel connection between a plurality of client proxy apparatuses, which also causes high performance overheads.

For a problem of high performance overheads in the solution shown in FIG. 3 or FIG. 4, embodiments of this application provide an access control method. In the solution shown in FIG. 3 or FIG. 4, a tunnel connection established between the client proxy apparatus and the gateway device is mainly for consideration of link security and authentication. In the access control method provided in embodiments of this application, the following ideas are used to resolve considerations of the two aspects.

The first aspect is how to ensure security of network data transmission. For a session that is initiated by an application client and that meets an encryption strength requirement, before forwarding a session negotiation packet to the gateway device, the client proxy apparatus does not need to further perform encrypted tunnel encapsulation. This reduces overheads caused by additional encryption and decryption of a tunnel. Optionally, for a session that is initiated by the application client and that does not meet the encryption strength requirement, encrypted tunnel encapsulation, for example, HTTPS tunnel encapsulation, is further performed, and link security is ensured through a tunnel.

The second aspect is to resolve a problem of how to carry authentication information. For a to-be-created session that meets an encryption requirement, the client proxy apparatus modifies a transport layer packet header of an original session negotiation packet to carry the authentication information, to multiplex an original session negotiation packet. The gateway device obtains the authentication information from the transport layer packet header of the modified session negotiation packet, and performs authentication on the authentication information. If the currently obtained token information is illegal, the gateway device blocks the current session between the gateway device and the client proxy apparatus: and if the currently obtained token information is legal, the gateway device establishes a connection to the real server, and forwards a subsequent service packet between the real server and the application client. Therefore, a problem of authenticating an access initiator by the gateway device is resolved. In this way, the client proxy apparatus does not need to perform tunnel encapsulation on the service packet, and carries the token information through the tunnel packet header. This reduces overheads caused by additional tunnel encryption and decryption.

The following describes in detail main implementation principles, specific implementations, and benefits of the technical solutions provided in embodiments of this application with reference to the accompanying drawings.

Figure 6:
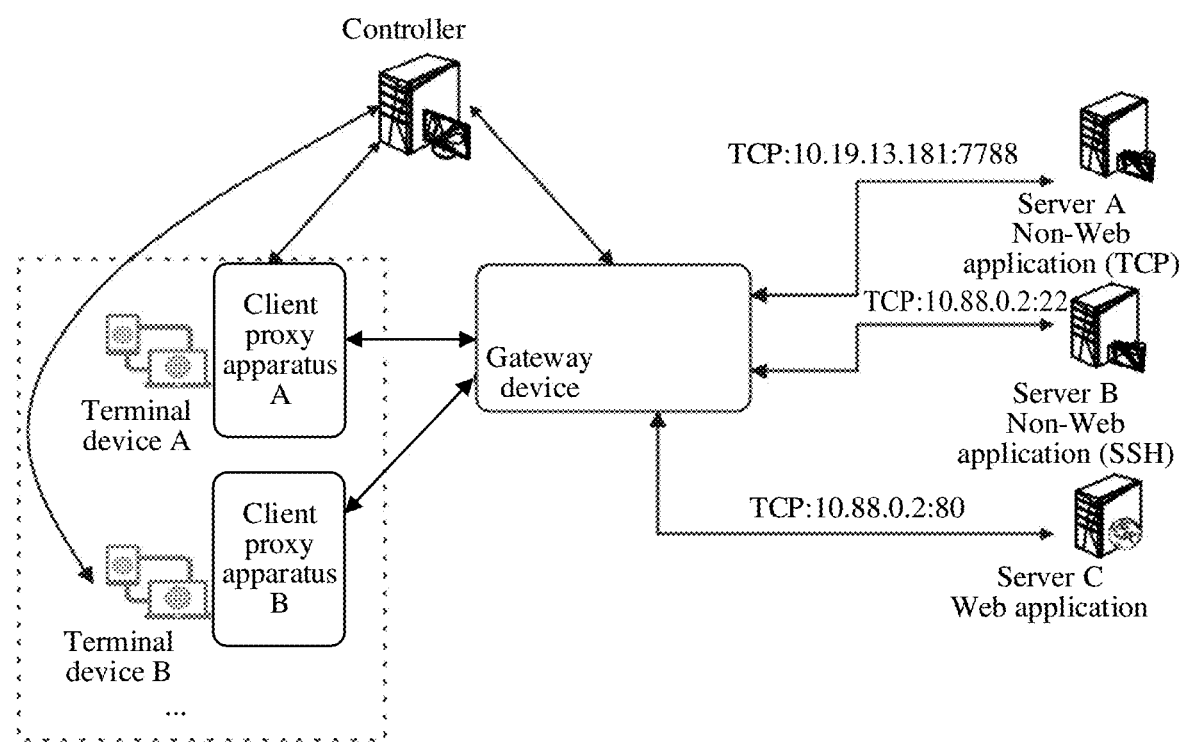
FIG. 6 is a schematic diagram of an application scenario of an access control method according to an embodiment of this application.

FIG. 6 is a schematic diagram of an application scenario of an access control method according to an embodiment of this application. Similar to FIG. 1, FIG. 3, and FIG. 4, the scenario described in FIG. 6 includes an access control system and a protected application resource. The access control system includes three types of devices: a controller, a gateway device, and a terminal device. The protected application resource includes three servers in the protected network. A server A provides a TCP service through a port 7788 on an IP address 10.19.13.181, a server B provides an SSH service through a port 22 on an IP address 10.88.0.2, and a server C provides a Web service through a port 80 on the IP address 10.88.0.2. According to a configuration of a controller, the foregoing three services are mapped to a port 8443 on a virtual IP address 10.0.3.11 of the gateway device.

The controller is configured to: after performing access control and identity authentication on a terminal device and a user based on a request of the client proxy apparatus, deliver authentication information and a list of accessible resources to the client proxy apparatus; and deliver a control policy corresponding to an authorized user to the gateway device, so that the gateway device controls access of the terminal device to the protected application resource according to the control policy.

The client proxy apparatus is installed in the terminal device. Before the terminal device accesses various applications, the client proxy apparatus further obtains, from the controller through identity authentication and an access control process, a virtual IP address and a port number of a gateway device to which each service that the terminal device and the user are allowed to access is mapped, and an address and a port number of a corresponding real server. The client proxy apparatus is configured to intercept a packet sent by an application client on the terminal device in which the client proxy apparatus is located, and initiate establishing a connection to the gateway device based on the packet.

In embodiments of this application, only two terminal devices: a terminal device A and a terminal device B are used as an example for description. When there are more terminal devices, functions of other terminal devices are similar to functions of the terminal device A or the terminal device B. A client proxy apparatus A is installed in the terminal device A, and a client proxy apparatus B is installed in the terminal device B.

The gateway device is configured to extract authentication information from traffic sent by the client proxy apparatus, initiate authentication, and perform a corresponding action based on an authentication result. For example, when the authentication fails, the gateway device blocks a connection between the gateway device and the client proxy apparatus, or when the authentication succeeds, the gateway device establishes a connection to the server, and transmits a subsequent service packet between the application client and the server through the connection between the gateway device and the server.

In embodiments of this application, the following improvements are mainly made to the client proxy apparatus and the gateway device.

After intercepting a session negotiation packet used by the application client to create a session with the server, the client proxy apparatus provided in embodiments of this application adds authentication information to a transport layer packet header of the session negotiation packet to obtain a modified session negotiation packet when a to-be-created session meets an encryption strength requirement. The client proxy apparatus sends the modified session negotiation packet to the gateway device, so that the gateway device authenticates the terminal device and the user based on the authentication information carried in the transport layer packet header of the modified session negotiation packet. In this way, an objective of transferring the authentication information is achieved by reusing the session negotiation packet sent by the application client, and a tunnel establishment process does not need to be additionally initiated. The authentication information is transferred through the session negotiation packet in a tunnel establishment process initiated by the application client. This saves processing resources consumed for performing additional tunnel negotiation on the terminal device and the gateway device, and helps reduce performance overheads of the terminal device and the gateway device.

After receiving the session negotiation packet from the client proxy apparatus, the gateway apparatus provided in embodiments of this application determines whether the transport layer packet header of the session negotiation packet carries the authentication information. If the transport layer packet header of the session negotiation packet carries the authentication information, the gateway device initiates authentication based on the authentication information carried in the transport layer packet header of the session negotiation packet. When the authentication succeeds, the session negotiation packet is not decapsulated and forwarded. In this way, when the to-be-created session initiated by the application client meets the encryption strength requirement, the gateway device does not need to perform tunnel decapsulation on the session negotiation packet, and then obtain the authentication information from the application layer. This saves processing resources, and improves authentication efficiency and processing performance.

Optionally, when the to-be-created session between the application client and the server meets the encryption strength requirement, after the authentication succeeds, the client proxy apparatus and the gateway device may switch from a proxy mode to a stream mode for transmitting a subsequent service packet, and there is no need to perform tunnel transmission or proxy mode forwarding on the service packet. This may save processing resources consumed by the terminal device and the gateway device for performing tunnel-related encapsulation and decapsulation processes and possibly involved encryption and decryption processing. Therefore, performance overheads of the terminal device and the gateway device are reduced, and overall performance of the access control system is improved.

Figure 7:
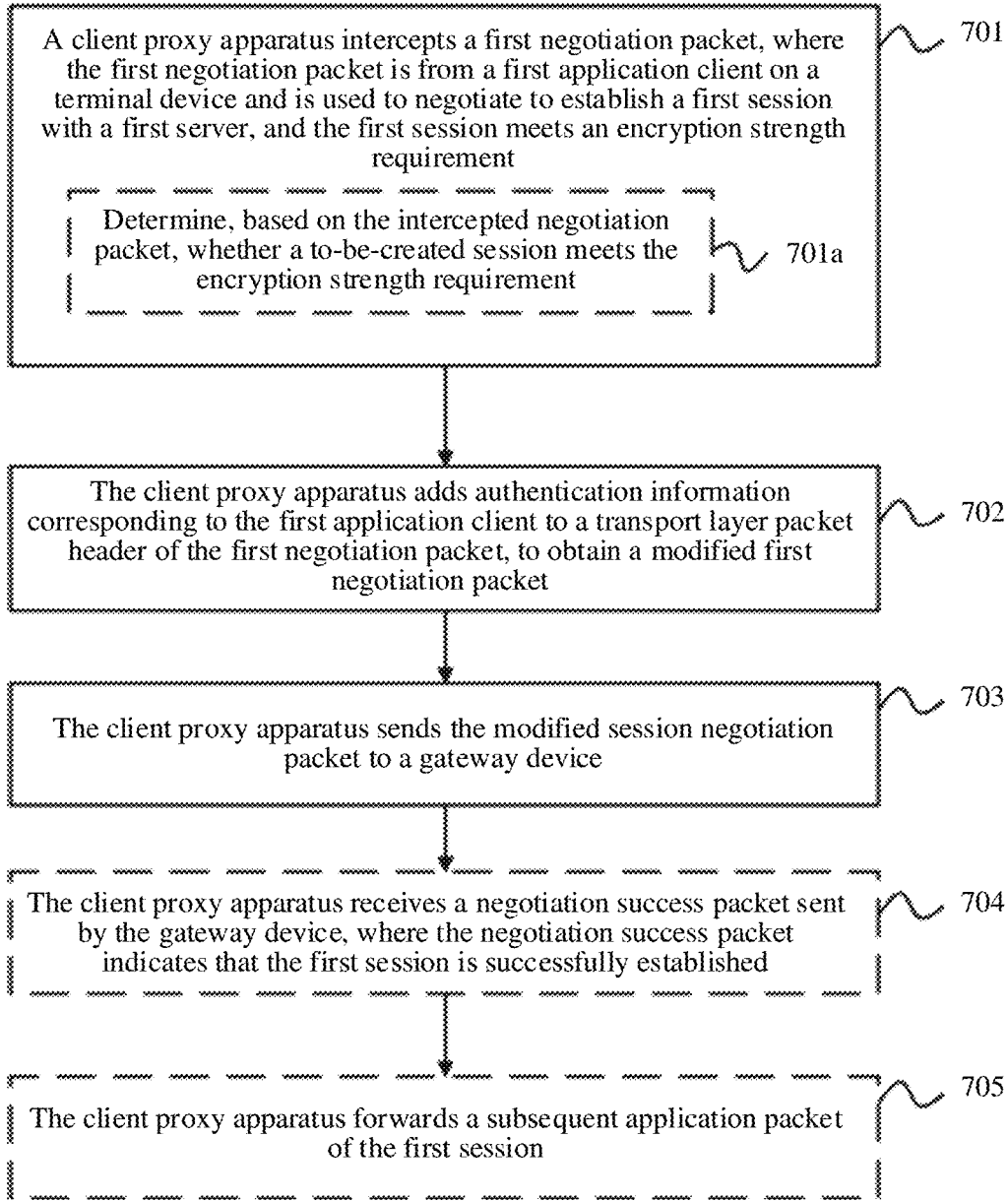
FIG. 7 is a flowchart of an access control method according to an embodiment of this application.

FIG. 7 is a flowchart of an access control method according to an embodiment of this application, including step 701 to step 704. The flowchart shown in FIG. 7 mainly describes the access control method provided in embodiments of this application from a perspective of a client proxy apparatus in a terminal device. Optionally, the terminal device in the embodiment described in FIG. 7 is the terminal device A or the terminal device B in FIG. 6. Correspondingly, when the terminal device in FIG. 7 is the terminal device A in FIG. 6, the client proxy apparatus in the embodiment described in FIG. 7 is the client proxy apparatus A in FIG. 6, and when the terminal device in FIG. 7 is the terminal device B in FIG. 6, the client proxy apparatus in the embodiment described in FIG. 7 is the client proxy apparatus B in FIG. 6.

Step 701: A client proxy apparatus intercepts a first negotiation packet, where the first negotiation packet is from a first application client on a terminal device and is used to perform negotiation to establish a first session with a first server, and the first session meets an encryption strength requirement.

In a zero-trust C/S scenario, the terminal device enables, by default, a client proxy apparatus installed on the terminal device. When an application client in the terminal device initiates a connection, the client proxy apparatus intercepts a session negotiation packet sent by an application client.

In embodiments of this application, an "application client" is application client software installed on the terminal device, for example, FTP client software using FileZilla as an example (FileZilla may be used as FTP client software, or may be used as FTPS client software), or a telnet client in a command line manner built in a Windows series operating system. In embodiments of this application, the first negotiation packet is, for example, a session negotiation packet that is sent when the FileZilla client initiates creation of the first session with the FTPS server.

Optionally, a manner in which the client proxy apparatus intercepts the session negotiation packet is related to a specific operating system. For example, Netfilter is one framework provided by a Linux kernel and allows various network-related operations to be implemented in the form of a customized processing program. Netfilter provides various functions and operations for packet filtering, network address translation, and port translation. In a Linux operating system, the client proxy apparatus intercepts a session negotiation packet from the application client and a subsequent service packet through a Hook function added to the NetFilter.

The client proxy apparatus serves as a proxy device between the application client and the gateway device, and separately communicates with the application client and the gateway device in a proxy mode. For the application client, the client proxy apparatus serves as a proxy server. For the gateway device, the client proxy apparatus serves as a proxy client. Before receiving the session negotiation packet from the application client, the client proxy apparatus first establishes a TCP connection to the application client through a three-way handshake process, and receives the session negotiation packet through the established TCP connection. Similarly, before step 702, the client proxy apparatus establishes the TCP connection to the gateway device through the three-way handshake process, and in step 703, sends the modified session negotiation packet through the established TCP connection.

Optionally, the client proxy apparatus or another component on the terminal device determines whether the to-becreated session corresponding to the intercepted session negotiation packet meets the encryption strength requirement. For example, when the client proxy apparatus determines whether the to-be-created session meets the encryption strength requirement, the client proxy apparatus first intercepts a session negotiation packet generated by the application client, and performs the step shown in step 701*a* on the intercepted session negotiation packet. When the to-be-created session meets the encryption strength requirement, the intercepted session negotiation packet is the first negotiation packet, and the to-be-created session is the first session.

When another component determines whether the first session meets the encryption strength requirement, the client proxy apparatus first intercepts a packet generated by the application client, and the another component performs the step shown in step 701*a* on the intercepted session negotiation packet. When the to-be-created session meets the encryption strength requirement, the intercepted session negotiation packet is the first negotiation packet, and the to-be-created session is the first session.

Step 701*a*: Determine, based on the intercepted session negotiation packet, whether a to-be-created session meets the encryption strength requirement.

Optionally, after intercepting the session negotiation packet, the client proxy apparatus performs protocol parsing on the intercepted session negotiation packet, and determines, based on a protocol type of the session negotiation packet, carried information related to encryption strength, and the like, whether the negotiated session meets the encryption strength requirement. The information related to the encryption strength carried in the session negotiation packet includes but is not limited to a protocol version number and/or a cipher suite identifier list.

In embodiments of this application, a case that the session created by negotiation by using the session negotiation packet meets the encryption strength requirement includes at least one of the following: the session created by the session negotiation packet is an encrypted application, and/or transmission security of the to-be-created session is higher than a preset security standard based on encryption strength-related information carried in the session negotiation packet, or the like.

In a first instance in which the session meets the encryption strength requirement, the intercepted session negotiation packet carries a specified protocol version number, where transmission security of implementation of a protocol version corresponding to the specified protocol version number is higher than the preset security standard, and data transmission is performed by using the first session based on the protocol version.

In a second instance in which the session meets the encryption strength requirement, the intercepted negotiation packet includes a specified cipher suite identifier, where the specified cipher suite identifier identifies a specified cipher suite, transmission security implemented by the specified cipher suite is higher than the preset security standard, and application data in the first session is encrypted based on the specified cipher suite.

In embodiments of this application, a case that the session created by negotiation by using the session negotiation packet does not meet the encryption strength requirement is another case except the foregoing case that the encryption strength requirement is met. For example, a case that a session created by negotiation by using the session negotiation packet does not meet the encryption strength requirement includes but is not limited to at least two scenarios. In a first scenario, the client proxy apparatus determines that the session created by using the session negotiation packet is an encrypted application, but determines, based on encryption strength-related information carried in the session negotiation packet, that transmission security of the to-be-created session is lower than the preset security standard: and in a second scenario, the client proxy apparatus determines that the session created by using the session negotiation packet is a plaintext application, namely, an unencrypted application.

In this embodiment, an example in which the first negotiation packet is a client hello message is used for description. When the application client is an FTPS client, a TLS layer encryption parameter needs to be negotiated before the FTPS client requests to establish a connection to an FTPS server. In other words, a TLS tunnel needs to be negotiated. In compliance with an existing TLS standard, a handshake process is performed between the client and the server to negotiate the TLS layer encryption parameter. In the handshake process, the client first sends the Client Hello message to the server, where the Client Hello message carries a protocol version number and a cipher suite identifier list.

Figure 8:
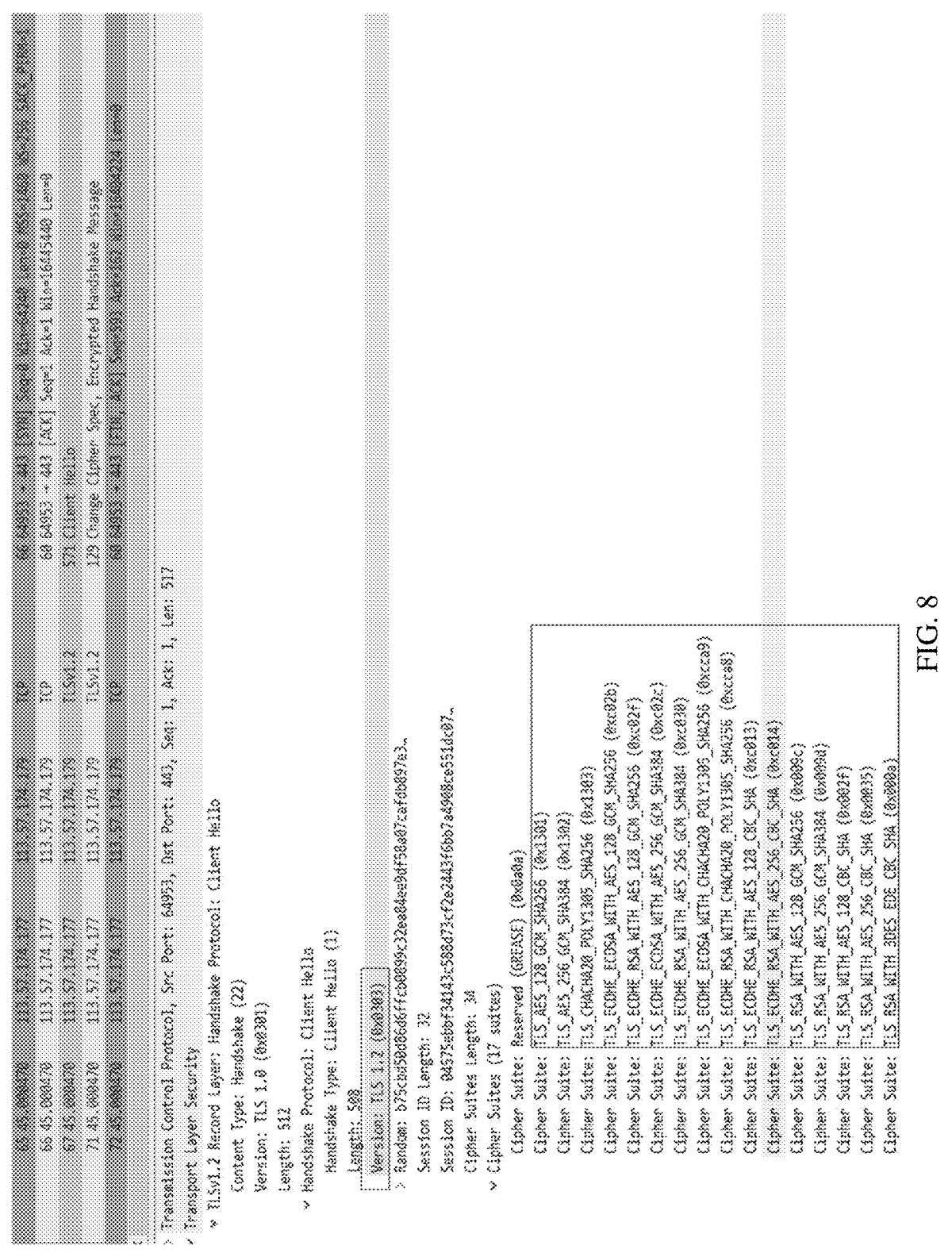

After intercepting the Client Hello message, the client proxy apparatus obtains, by parsing, content carried in the Client Hello message, as shown in FIG. 8. FIG. 8 indicates that a transport layer protocol header of a Client Hello message carries a protocol version number and a cipher suite identifier list by using a solid box. In the example shown in FIG. 8, the protocol version number carried in the Client Hello message is TLS 1.2. After receiving the Client Hello message, a server selects a cipher suite based on the cipher suite identifier list carried in the Client Hello message, and subsequently encrypts a service packet by using a protocol corresponding to the protocol version number carried in the Client Hello message and the selected cipher suite.

Embodiments of this application separately provide a manner (manner 1) in which the client proxy apparatus determines, based on the protocol version number, whether the first session meets an encryption strength requirement, and a manner (manner 2) in which the client proxy apparatus determines, based on the cipher suite identifier list, whether the first session meets the encryption strength requirement. Either of the two manners may be used or the two manners may be used in combination.

Manner 1

The encryption strength requirement pre-stored by the client proxy apparatus includes a protocol version number set, where transmission security of implementation of a protocol version corresponding to a protocol version number in the protocol version number set is higher than a preset security standard.

The client proxy apparatus determines whether the protocol version number carried in the session negotiation packet belongs to the protocol version number set. If the protocol version number carried in the session negotiation packet belongs to the protocol version number set, it is determined that the session meets the encryption strength requirement: or if the protocol version number carried in the session negotiation packet does not belong to the protocol version number set, it is determined that the session does not meet the encryption strength requirement.

For example, the protocol version number set included in the encryption strength requirement is {TLS 1.2, TLS 1.3}. If the protocol version number carried in the Client Hello message is TLS 1.2, which belongs to the protocol version number set, it is determined that the to-be-established session meets the encryption strength requirement. If the protocol version number carried in the Client Hello message is TLS 1.0, which does not belong to the protocol version number set, it is determined that the to-be-established session does not meet the encryption strength requirement.

Manner 2

The encryption strength requirement pre-stored by the client proxy apparatus includes a cipher suite identifier set, and transmission security implemented by a cipher suite corresponding to the cipher suite identifier in the cipher suite identifier set is higher than the preset security standard.

The client proxy apparatus determines whether the cipher suite identifier list carried in the first negotiation packet includes the cipher suite identifier in the cipher suite identifier set. If the cipher suite identifier list carried in the first negotiation packet includes the cipher suite identifier in the cipher suite identifier set, the client proxy apparatus determines that the first session meets the encryption strength requirement: or if the cipher suite identifier list carried in the first negotiation packet does not include the cipher suite identifier in the cipher suite identifier set, the client proxy apparatus determines that the first session does not meet the encryption strength requirement.

For example, the cipher suite identifier set included in the encryption strength requirement is {TLS_ECDHE_RSA_WITH_AES_128_CBC_SHA,
TLS_ECDHE_ECDSA_WITH_AES_256_GCM_SHA384
...}

The set includes a cipher suite identifier whose encryption level is medium or high.

If the cipher suite identifier list carried in the Client Hello message includes one or more cipher suite identifiers in the cipher suite identifier set, it is determined that the to-be-established session meets the encryption strength requirement. If the cipher suite identifier list carried in the Client Hello message does not include any cipher suite identifier in the cipher suite identifier set, it is determined that the to-be-established session does not meet the encryption strength requirement.

The client proxy apparatus determines, based on the first negotiation packet, that the first session meets the encryption strength requirement, and performs step 702.

Step 702: The client proxy apparatus adds authentication information corresponding to the first application client to a transport layer packet header of the first negotiation packet, to obtain a modified first negotiation packet.

When the to-be-established session between the application client and the server meets the encryption strength requirement, it indicates that the session has an encryption mechanism, and link security may be ensured. In this case, the client proxy apparatus does not need to establish an additional encrypted tunnel with the gateway device to ensure link security. To transfer the authentication information, the client proxy apparatus may multiplex an original session negotiation packet to carry the authentication information. Still using the Client Hello message as an example, the client proxy apparatus adds a new TLS option field to a transport layer packet header of the Client Hello message, and carries the authentication information in a newly added TLS option field. In a specific implementation, the authentication information includes but is not limited to one of the several pieces of information shown in Table 1, or a combination of at least two pieces of the several pieces of information.

TABLE 1

| Authentication information | Description |
| --- | --- |
| User token | Used for authentication of a user |
| Application token | Used for authentication of an application |
| Device ID | Used for authentication of a device |
| IP address and/or port number PORT of a real server | Used to connect to a real server after authentication succeeds |

Optionally, the authentication information further includes a timestamp, an IP address of a terminal device, a current operating status of the terminal device, a security scanning result, or the like, which is not listed one by one herein.

Optionally, to distinguish a case that a gateway device carries the authentication information in a transport layer packet header from the solution shown in FIG. 3, it is confirmed that the session negotiation packet sent by the client proxy apparatus is a session negotiation packet that is multiplexed when a to-be-created session meets an encryption strength requirement, or a tunnel packet that is obtained by additional encapsulation, so that decapsulation is not performed when the session negotiation packet is multiplexed, and when multiplexing the session negotiation packet, the client proxy apparatus indicates the gateway device to skip performing tunnel decapsulation on the first negotiation packet in a default manner or an explicit manner.

For example, in the default manner, provided that the transport layer packet header of the session negotiation packet carries the authentication information, it indicates that the to-be-created session meets the encryption strength requirement, and the gateway device skips performing tunnel decapsulation on the first negotiation packet. If the to-be-created session does not meet the encryption strength requirement, the client proxy apparatus carries the authentication information in the application layer packet header of the tunnel packet after performing tunnel encapsulation on the session negotiation packet.

For example, in the explicit manner, when the to-be-created session meets the encryption strength requirement, the client proxy apparatus further carries indication information in addition to carrying the authentication information in the transport layer packet header of the first negotiation packet. The indication information enables the gateway device to skip performing decapsulation on the modified first negotiation packet. A specific position of the indication information in the transport layer packet header is not limited herein.

In a specific implementation, embodiments of this application further provide a manner of carrying the indication information: When the authentication information is carried in a TLS option field, the TLS option field conforms to a TLV structure. A type T field in the TLV structure is used to carry indication information, the indication information is used to enable the gateway device to skip performing TLS decapsulation processing on the modified session negotiation packet, and the value V field is used to carry the authentication information.

Step 703: The client proxy apparatus sends the modified first negotiation packet to a gateway device.

In embodiments of this application, after intercepting the session negotiation packet of the session that meets the encryption strength requirement and is initiated by the first application client, the client proxy apparatus adds the authentication information to the transport layer packet header of the session negotiation packet to obtain the modified session negotiation packet, and sends the modified session negotiation packet to the gateway device, so that the gateway device authenticates the terminal device and the user based on the authentication information carried in the transport layer packet header of the session negotiation packet. In this way, an original session negotiation packet of the application client is multiplexed between the client proxy apparatus and the gateway device to implement an objective of transferring the authentication information. In this way, on the premise of ensuring connection security and transferring the authentication information, the client proxy apparatus and the gateway device do not need to establish an additional encrypted tunnel. This saves processing resources consumed for performing additional tunnel negotiation on the terminal device and the gateway device, and helps reduce performance overheads of the terminal device and the gateway device.

Optionally, the gateway device authenticates a session initiator based on the modified first negotiation packet that is sent in step 703. If the authentication succeeds, the client proxy apparatus performs step 704 and step 705.

Step 704: The client proxy apparatus receives a negotiation success packet sent by the gateway device, where the negotiation success packet indicates that the first session is successfully established.

After successfully authenticating the terminal device and the user based on the authentication information carried in the modified session negotiation packet sent in step 703, the gateway device sends a negotiation success packet to the client proxy apparatus through a TCP connection between the gateway device and the client proxy apparatus, to complete a TLS handshake with the client proxy apparatus. The client proxy apparatus sends the negotiation success packet to the application client through the TCP connection between the client proxy apparatus and the first application client, to complete the TLS handshake with the first application client. In this way, a session between the first application client and the first server is substantially created successfully, the first application client and the first server may start to transmit a service packet through the created session, and the client proxy apparatus performs step 705 after step 704.

Step 705: The client proxy apparatus forwards a subsequent service packet of the first session.

If the gateway device successfully authenticates the terminal device and the user based on the authentication information carried in the modified session negotiation packet, the client proxy apparatus does not need to establish an additional encrypted tunnel to transmit a subsequent service packet of the first session between the first application client and the gateway device. This saves processing resources consumed by the terminal device and the gateway device for performing a tunnel encapsulation or decapsulation process and possibly involved encryption and decryption processing, reduces performance overheads of the terminal device and the gateway device, and helps improve overall performance of the access control system.

The foregoing FTPS client software is still used as an example to describe the subsequent service packet of the first session. The subsequent service packet of the first session includes: FTPS client software sends a file download request to an FTPS server, where the download request carries parameters such as a file name and a download path, and the FTPS server returns a requested resource file to the FTPS client software: or the FTPS client software sends a file upload request to the FTPS server, where the upload request carries parameters such as a file size and an upload path, and the FTPS server returns a file upload success or failure result to the FTPS client software.

The client proxy apparatus relays and forwards the subsequent service packet of the session created between the application client and the server. Optionally, the client proxy apparatus may transmit the subsequent packet of the session between the application client and the server in a plurality of different manners. In embodiments of this application, only two manners are used as an example for description.

Manner 1

The client proxy apparatus continues to transmit the subsequent packet of the first session in a proxy mode.

Refer to the foregoing description. The client proxy apparatus operates between the application client and the gateway device in the proxy mode, and the client proxy apparatus separately maintains a TCP connection between the client proxy apparatus and the application client and a TCP connection between the client proxy apparatus and the gateway device. Because the two TCP connections are established through an independent three-way handshake process, sequence numbers and acknowledgment numbers in packets transmitted in the two TCP connections are independent of each other. After step 705, an implementation in which the client proxy apparatus transmits the subsequent packet of the session between the application client and the server is that the client proxy apparatus continues to transmit the service packet between the application client and the gateway device through the two TCP connections respectively. For example, the client proxy apparatus performs transport layer parsing on the service packet sent by the application client, to obtain a transport layer payload, then adds a transport layer packet header to the transport layer payload obtained by parsing based on state information that is related to the TCP connection between the client proxy apparatus and the gateway device and maintained by the client proxy apparatus, to obtain a new service packet, and then sends the new service packet to the gateway device through the TCP connection between the client proxy apparatus and the gateway device. A service packet transmission principle in a reverse direction is similar, and details are not described herein.

Manner 2

A client proxy apparatus transmits the subsequent packet of the first session in a stream mode. The subsequent packet of the first session from the first application client is forwarded to the gateway device, and the subsequent packet of the first session from the gateway device is forwarded to the first application client, where the subsequent packet of the first session from the gateway device is in response to the subsequent packet of the first session from the first application client.

As mentioned above, when the to-be-created session between the application client and the server meets the encryption strength requirement, the client proxy apparatus may multiplex the packet sent by the application client without tunnel encapsulation. This means that after the authentication succeeds, in a forwarding process of the subsequent service packet of the client proxy apparatus, for one forwarding process, data carried in a service packet (a packet after forwarding) forwarded to the gateway device is the same as data carried in a packet (a packet before forwarding) received from the application client, and only a packet sequence (SYN) number and an acknowledgment (ACK) number may be different. Optionally, based on this consideration, to further save processing resources on the client proxy apparatus, after the authentication succeeds, the client proxy apparatus switches from the proxy mode to the stream mode, and provided that the sequence number and the acknowledgment number of the subsequent packet are adjusted during forwarding, the application client and the server may correctly reassemble the service packet without interrupting a session. It is not necessary to keep operating between the application client and the gateway device in the proxy mode.

Figure 9:
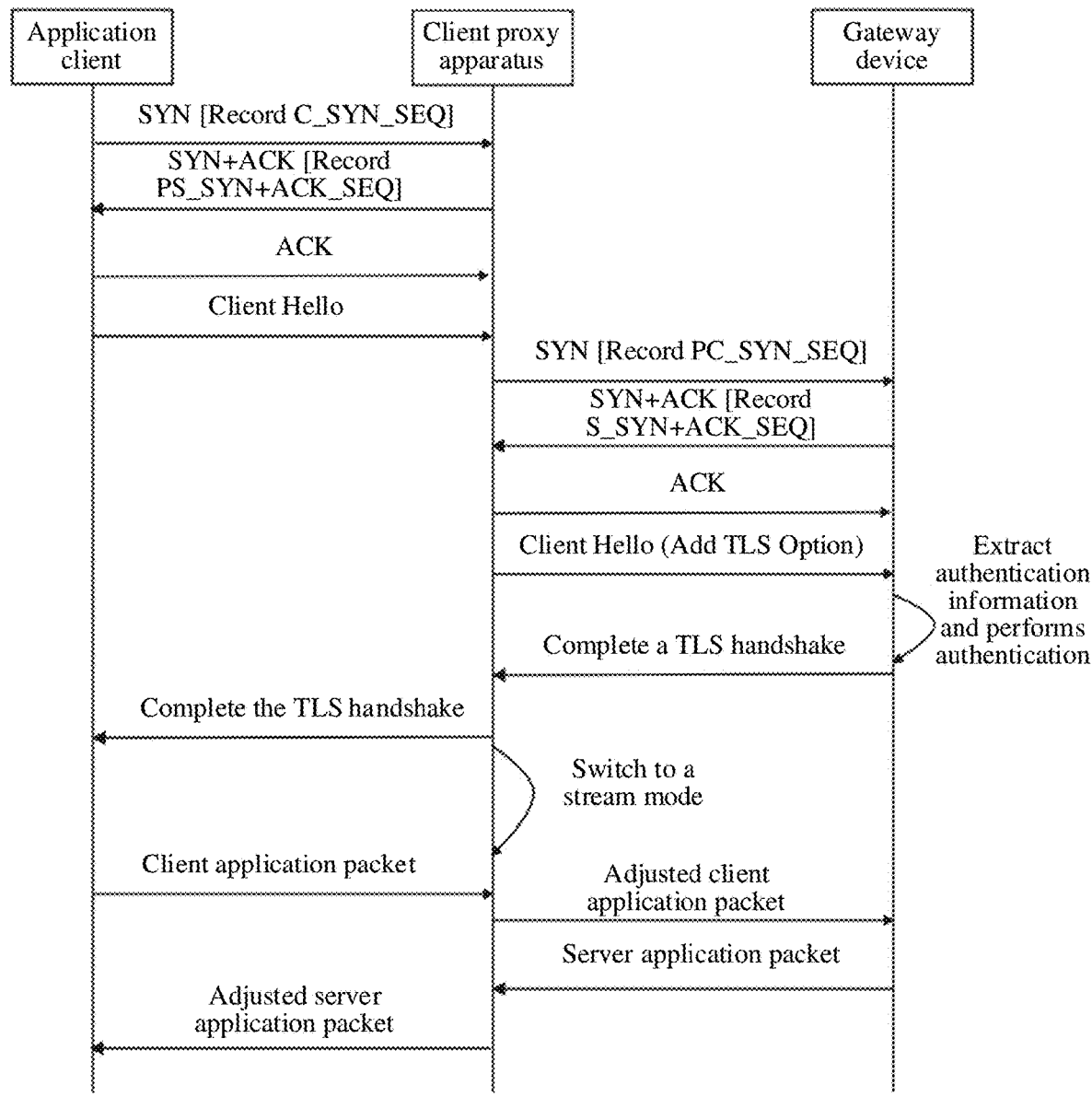
FIG. 9 is a schematic diagram of a sequence number and an acknowledgment number of a packet that need to be recorded in a process of establishing a three-party connection by an application client, a client proxy apparatus, and a gateway device according to an embodiment of this application.

To obtain a difference between the sequence number and the acknowledgment number that are required for implementing forwarding in the stream mode and that are before and after a packet is forwarded by the client proxy apparatus, the client proxy apparatus needs to record a sequence number and an acknowledgment number of an SYN packet and a sequence number of an SYN+ACK packet in two independent three-way handshake processes when the client proxy apparatus operates in the proxy mode, to adjust the sequence number and the acknowledgment number of the subsequent packet based on a sequence number difference and an acknowledgment number difference of a corresponding packet in the two three-way handshake processes. FIG. 9 is a schematic diagram of a sequence number and an acknowledgment number of a packet that need to be recorded in a process of establishing a three-party connection by an application client, a client proxy apparatus, and a gateway device.

As shown in FIG. 9, the client proxy apparatus records a sequence number and an acknowledgment number of an SYN packet sent by an application client, a sequence number and an acknowledgment number of an SYN packet sent by the client proxy apparatus serving as a proxy client, and a sequence number of an SYN+ACK packet sent by a server (the sequence number of the SYN+ACK packet sent by the server is equivalent to the sequence number of the SYN packet sent by the client proxy apparatus serving as the proxy client). A sequence number of the SYN+ACK packet sent by the client proxy apparatus as the proxy server (an acknowledgment number of the SYN+ACK packet sent by the client proxy apparatus serving as the proxy server is equivalent to a sequence number of the SYN packet sent by the application client).

The client proxy apparatus determines, based on the foregoing recorded information, a sequence number difference and an acknowledgment number difference of a packet before and after forwarding.

For example, SEQ_REQ_OFFSET is used to represent a sequence number difference before and after the client proxy apparatus forwards a packet from the application client, and a value of SEQ_REQ_OFFSET is a difference between the sequence number of the SYN packet sent by the client proxy apparatus serving as the proxy client and the sequence number of the SYN packet sent by the application client.

SEQ_REQ_OFFSET=PC_SYN_SEQ-C_SYN_SEQ

For example, ACK_REQ_OFFSET is used to represent an acknowledgment number difference before and after the client proxy apparatus forwards a packet from the application client, and a value of ACK_REQ_OFFSET is a difference between the acknowledgment number of the SYN packet sent by the client proxy apparatus serving as the proxy client and the acknowledgment number of the SYN packet sent by the application client.

ACK_REQ_OFFSET=PC_SYN_ACK-C_SYN_ACK

For example, SEQ_RESP_OFFSET is used to represent a sequence number difference before and after the client proxy apparatus forwards a packet from the server, and a value of SEQ_RESP_OFFSET is a difference between the sequence number of the SYN+ACK packet sent by the client proxy apparatus serving as the proxy server and the sequence number of the SYN+ACK packet sent by the server.

SEQ_RESP_OFFSET=PS_SYN+ACK_SEQ-S_SYN+ACK_SEQ

For example, ACK_RESP_OFFSET is used to represent an acknowledgment number difference before and after the client proxy apparatus forwards a packet from the server, and a value of ACK_RESP_OFFSET is a difference between the acknowledgment number of the SYN+ACK packet sent by the client proxy apparatus serving as the proxy server and the acknowledgment number of the SYN+ACK packet sent by the server.

ACK_RESP_OFFSET=PS_SYN+ACK_ACK-S_SYN+ACK_ACK=C_SYN_SEQ-PC_SYN_SEQ

The acknowledgment number of the SYN+ACK packet sent by the client proxy apparatus serving as the proxy server is equivalent to the sequence number of the SYN packet sent by the application client, and the acknowledgment number of the SYN+ACK packet sent by the server is equivalent to the sequence number of the SYN packet sent by the client proxy apparatus serving as the proxy client. Therefore, the value of ACK_RESP_OFFSET is a difference between the sequence number of the SYN packet sent by the application client and the sequence number of the SYN packet sent by the client proxy apparatus serving as the proxy client.

Figure 10:
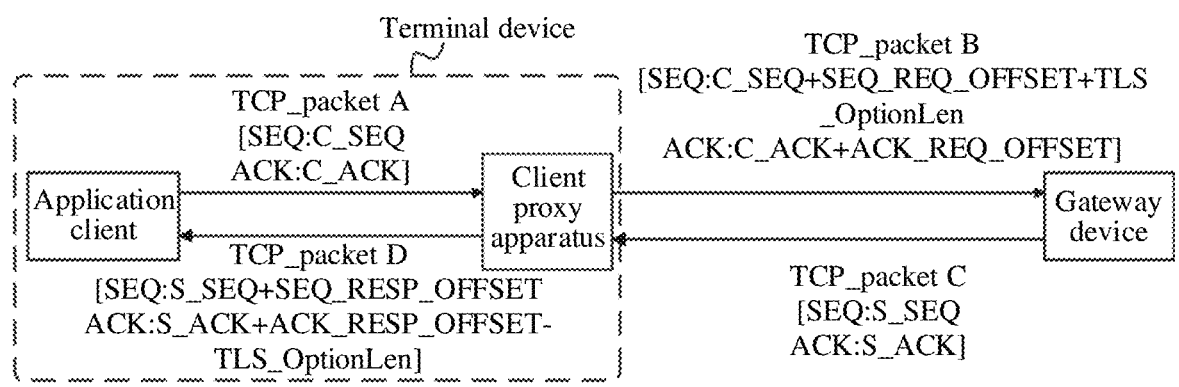
FIG. 10 is a detailed schematic diagram of adjusting a forwarded packet by a client proxy apparatus according to an embodiment of this application.

Further, the client proxy apparatus adjusts a sequence number and an acknowledgment number of a service packet (referred to as a "client service packet" for short) sent by the application client in a stream mode packet forwarding process by using the foregoing difference, and adjusts a sequence number and an acknowledgment number of a service packet (referred to as a "server service packet" for short) that is from the server and that is in response to the client service packet. FIG. 10 is a detailed schematic diagram of adjusting a forwarded packet by a client proxy apparatus according to an embodiment of this application.

In FIG. 10, in a direction from left to right, an application client, the client proxy apparatus, and a gateway device are sequentially arranged. The application client and the client proxy apparatus are located in a terminal device.

Optionally, the application client in FIG. 10 is located in a terminal device A or a terminal device B in FIG. 6, or is the application client in FIG. 8 or FIG. 9, for example, the FTPS client FileZilla mentioned above.

The client proxy apparatus in FIG. 10 is a client proxy apparatus A or a client proxy apparatus B in FIG. 6, or the client proxy apparatus in FIG. 8 or FIG. 9.

The gateway device in FIG. 10 is the gateway device in FIG. 6, FIG. 7, or FIG. 8.

Refer to FIG. 10. A process in which the client proxy apparatus adjusts a packet sent by the application client after a three-way handshake is first described in a direction from left to right. It is assumed that a sequence number of a packet (represented by TCP_packet A) sent by the application client is represented by C_SEQ, and an acknowledgment number is represented by C_ACK. It is assumed that a packet that is obtained after the client proxy apparatus adjusts a sequence number and an acknowledgment number of the TCP_packet A is represented by TCP_packet B.

The client proxy apparatus adds the sequence number C_SEQ of the TCP_packet A, a sequence number difference SEQ_REQ_OFFSET before and after the client proxy apparatus forwards the packet from the application client, and an offset (denoted as TLS_OptionLen) caused by adding a length of a TLS option field, to obtain a sequence number of the TCP_packet B. In other words, a value of the sequence number of the TCP_packet B is C_SEQ+SEQ_REQ_OFFSET+TLS_OptionLen.

The client proxy apparatus adds the acknowledgment number C_ACK of the TCP_packet A to an acknowledgment number difference ACK_REQ_OFFSET before and after the client proxy apparatus forwards the packet from the application client, to obtain an acknowledgment number of the TCP_packet B. In other words, a value of the acknowledgment number of the TCP_packet B is C_ACK+ACK_REQ_OFFSET.

The following describes, in a direction from right to left, a process in which the client proxy apparatus adjusts the packet that is sent by the gateway device and that is after the three-way handshake. It is assumed that a sequence number of a packet (represented by TCP_packet C) sent by the gateway device is represented by S_SEQ, and an acknowledgment number is represented by S_ACK. It is assumed that a packet that is obtained after the client proxy apparatus adjusts a sequence number and an acknowledgment number of the TCP_packet C is represented by TCP_packet D.

The client proxy apparatus adds the sequence number S_SEQ of the TCP_packet C to a sequence number difference SEQ_RESP_OFFSET before and after the client proxy apparatus forwards the packet from the server, to obtain a sequence number of the TCP_packet D. In other words, a value of the sequence number of the TCP_packet D is S_SEQ+SEQ_RESP_OFFSET.

The client proxy apparatus adds the acknowledgment number S_ACK of the TCP_packet C to an acknowledgment number difference ACK_REQ_OFFSET before and after the client proxy apparatus forwards the packet from the application client, and subtracts an offset (denoted as TLS_OptionLen) caused by a length of the TLS option field, to obtain an acknowledgment number of the TCP_packet D. In other words, a value of the acknowledgment number of the TCP_packet B is S_ACK+ACK_RESP_OFFSET-TLS_OptionLen.

In Table 2, some symbols in FIG. 9 and FIG. 10 are briefly described.

TABLE 2

| Symbol name | Description |
|---|---|
| C_SYN_SEQ | Sequence number of an SYN packet sent by an application client |
| S_SYN + ACK_SEQ | Sequence number of an SYN + ACK packet sent by a server |
| PC_SYN_SEQ | Sequence number of an SYN packet sent by a client proxy apparatus serving as a proxy client |
| PS_SYN + ACK_SEQ | Sequence number of an SYN + ACK packet sent by a client proxy apparatus serving as a proxy server |
| SEQ_REQ_OFFSET | PC_SYN_SEQ-C_SYN_SEQ Difference between a sequence number of an SYN packet sent by a client proxy apparatus serving as a proxy client and a sequence number of an SYN packet sent by an application client |
| ACK_REQ_OFFSET | PS_SYN_ACK-S_SYN_ACK Difference between an acknowledgment number of an SYN packet sent by a client proxy apparatus serving as a proxy client and an acknowledgment number of an SYN packet sent by an application client |
| SEQ_RESP_OFFSET | PS_SYN + ACK_SEQ-S_SYN + ACK_SEQ Difference between a sequence number of an SYN + ACK packet sent by a client proxy apparatus serving as a proxy server and a sequence number of an SYN + ACK packet sent by a server |
| ACK_RESP_OFFSET | PS_SYN + ACK_ACK-S_SYN + ACK_ACK Difference between an acknowledgment number (equivalent to a sequence number of an SYN packet sent by an application client) of an SYN + ACK packet sent by a client proxy apparatus serving as a proxy server and an acknowledgment number (equivalent to a sequence number of an SYN packet sent by a client proxy apparatus serving as a proxy client) of an SYN + ACK packet sent by a server |
| C_SEQ\C_ACK | Sequence number/acknowledgment number of a service packet sent by an application client |
| S_SEQ\S_ACK | Sequence number/acknowledgment number of a service packet sent by a server |

Figure 11:
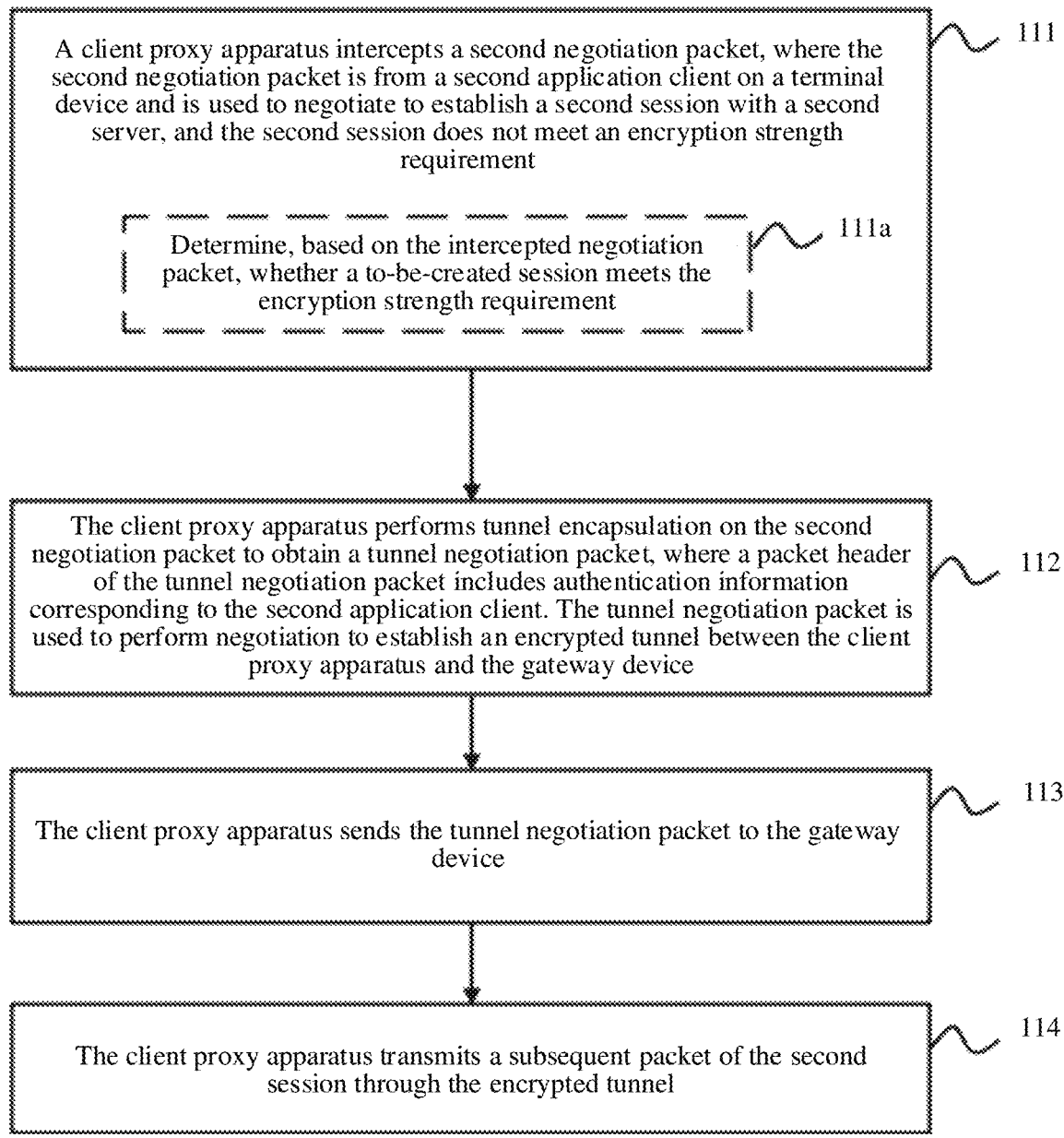
FIG. 11 is a flowchart of another access control method according to an embodiment of this application.

FIG. 11 is a flowchart of an access control method according to an embodiment of this application, including step 111 to step 115. FIG. 11 and FIG. 7 both describe an access control method provided in embodiments of this application from a perspective of a client proxy apparatus. A difference between FIG. 11 and FIG. 7 lies in that in FIG. 7, an example of a first negotiation packet sent by a first application client on a terminal device is used, to describe an access control method when a to-be-created session meets an encryption strength requirement, while in FIG. 11, an example of a second negotiation packet sent by a second application client on the terminal device is used, to describe an access control method when the to-be-created session does not meet the encryption strength requirement, which is an optional supplement to the embodiment described in FIG. 7. An application scenario in FIG. 11 is similar to the application scenario in FIG. 7, and is not repeated herein.

Step 111: A client proxy apparatus intercepts a second negotiation packet, where the second negotiation packet is from a second application client on a terminal device and is used to perform negotiation to establish a second session with a second server, and the second session does not meet an encryption strength requirement.

Optionally, a step that the client proxy apparatus or another component determines whether the to-be-created session meets the encryption strength requirement is similar to step 701. For example, when the client proxy apparatus determines whether the to-be-created session meets the encryption strength requirement, the client proxy apparatus intercepts a session negotiation packet generated by an application client, and performs the step shown in step 111a on the session negotiation packet. When the another component determines whether the to-be-created session meets the encryption strength requirement, after performing the step shown in step 111a on the intercepted session negotiation packet, the another component sends a negotiation packet of the to-be-created session that does not meet the encryption strength requirement to the client proxy apparatus.

In embodiments of this application, the second negotiation packet is, for example, a session negotiation packet that is sent when a telnet client initiates creation of the second session with a telnet server.

Step 111a: Determine, based on the intercepted session negotiation packet, whether a to-be-created session meets the encryption strength requirement.

A user enters a command, for example, "telnet 192.168.10.132", on the telnet client, where 192.168.10.132 is an IP address of the telnet server. The telnet client and the telnet server set up a TCP connection through a three-way handshake. Then, the user is prompted to enter a user name and password to log in to the telnet server. After the login succeeds, the user may enter a control command in the telnet client, for example, a command ls for displaying a directory list. The second negotiation packet is an SYN packet.

In embodiments of this application, the client proxy apparatus determines, based on the second negotiation packet, that a session created by negotiation is a non-encrypted application. In this case, an encryption requirement is not met.

In embodiments of this application, if the client proxy apparatus determines, based on the second negotiation packet, that the second session does not meet the encryption strength requirement, step 112 is performed.

Step 112: The client proxy apparatus performs tunnel encapsulation on the second negotiation packet to obtain a tunnel negotiation packet, where a packet header of the tunnel negotiation packet includes authentication information corresponding to the second application client. The tunnel negotiation packet is used to perform negotiation to establish an encrypted tunnel between the client proxy apparatus and the gateway device.

Step 113: The client proxy apparatus sends the tunnel negotiation packet to the gateway device.

Optionally, when a to-be-created second session does not meet the encryption strength requirement, the client proxy apparatus performs tunnel negotiation with the gateway device, and negotiates to establish the encrypted tunnel between the client proxy apparatus and the gateway device. For example, a TLS tunnel or an HTTPS tunnel shown in FIG. 3 or FIG. 4. If the TLS tunnel is established between the client proxy apparatus and the gateway device, the client proxy apparatus carries authentication information in a TLS option field of a Client Hello message. If the HTTPS tunnel is established between the client proxy apparatus and the gateway device, the client proxy apparatus carries authentication information in a Connect field and a cookie field of an application layer packet header The tunnel negotiation packet carries the authentication information, so that the gateway device authenticates the terminal device and the user by using the authentication information carried in the tunnel negotiation packet. In addition, a service packet from a telnet client and a service packet returned by a telnet server are encapsulated through the encrypted tunnel established through negotiation, to meet a link security requirement.

After sending the tunnel negotiation packet, the client proxy apparatus receives a tunnel establishment success packet correspondingly sent by the gateway device, where the tunnel establishment success packet indicates that the encrypted tunnel is successfully established.

Step 114: After an encrypted tunnel is successfully established, the client proxy apparatus transmits a subsequent packet of the second session through the encrypted tunnel.

The client proxy apparatus sends the subsequent packet of the second session from the second application client to the gateway device through the encrypted tunnel. After intercepting the subsequent packet of the second session from the second application client, the client proxy apparatus encapsulates the subsequent packet of the second session from the second application client based on the encrypted tunnel established through negotiation in step 114 to obtain a tunnel packet, and sends the tunnel packet to the gateway device. Optionally, after receiving the tunnel packet, the gateway device performs decapsulation on the tunnel packet, and sends a packet that is obtained through decapsulation to a second server.

In addition, the client proxy apparatus receives the subsequent packet of the second session from the gateway device through the encrypted tunnel. The client proxy apparatus receives the tunnel packet from the gateway device, performs decapsulation on the received tunnel packet to obtain the subsequent packet of the second session from the second server, and sends the subsequent packet of the second session from the gateway device that is obtained through decapsulation to the second application client.

An implementation process of step 111 is basically similar to an implementation process of step 701 in FIG. 7. The authentication information involved in step 112 is also similar to the authentication information involved in step 702 in FIG. 7. For similarities, refer to related descriptions of step 701 and step 702 in the foregoing embodiment. Details are not described herein again.

According to the access control method provided in embodiments of this application, after intercepting a session negotiation packet that is of a session, that is initiated by the second application client, and that does not meet an encryption strength requirement, the client proxy apparatus negotiates with the gateway device to establish an additional encrypted tunnel. The tunnel negotiation packet carries the authentication information, so that the gateway device authenticates the terminal device and the user by using the authentication information carried in the tunnel negotiation packet. In addition, a service packet in a plaintext form between an application client and a server is encapsulated through the encrypted tunnel established through negotiation, to ensure that the link security requirement is met.

Figure 12:
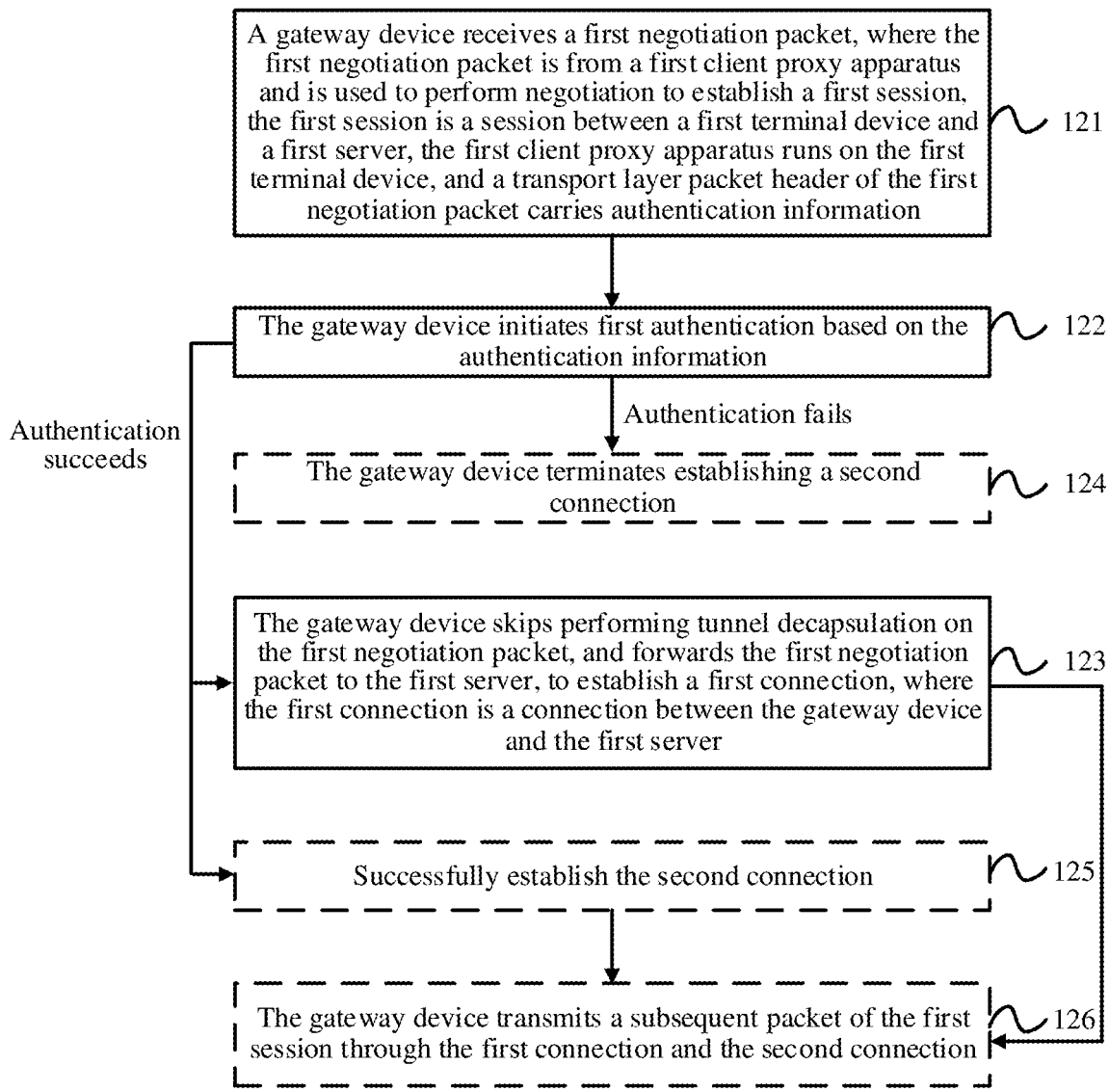
FIG. 12 is a flowchart of another access control method according to an embodiment of this application.

FIG. 12 is a flowchart of an access control method according to an embodiment of this application, including step 121 to step 126. The flowchart shown in FIG. 12 mainly describes the access control method provided in embodiments of this application from a perspective of a gateway device. Optionally, the gateway device in the embodiment described in FIG. 12 is the gateway device in the embodiments described in FIG. 6 to FIG. 11. The gateway device in FIG. 12 cooperates with a terminal device or a server in the embodiments described in FIG. 6 to FIG. 11, to implement access control on the terminal device.

Step 121: A gateway device receives a first negotiation packet, where the first negotiation packet is from a first client proxy apparatus and is used to perform negotiation to establish a first session, the first session is a session between a first terminal device and a first server, the first client proxy apparatus runs on the first terminal device, and a transport layer packet header of the first negotiation packet carries authentication information.

Optionally, after receiving the first negotiation packet, the gateway device first determines whether the transport layer packet header of the first negotiation packet carries the authentication information. For example, the gateway device performs protocol parsing on the first negotiation packet, and attempts to obtain the authentication information in the transport layer packet header of the first negotiation packet. For example, when the first negotiation packet is a Client Hello message, the gateway device determines whether a TLS option exists in a transport layer packet header of the Client Hello message, and if the TLS option exists, obtains authentication information carried in a TLS option field of the Client Hello message. For descriptions of the authentication information, refer to the descriptions in step 702 in FIG. 7. Details are not described herein again.

When the transport layer packet header of the first negotiation packet carries the authentication information, the gateway device performs step 122.

Step 122: The gateway device initiates first authentication based on the authentication information.

There are a plurality of authentication implementations. In embodiments of this application, only two of the implementations are briefly described. Based on adjustment and modification of authentication implementation details, a plurality of other authentication implementations may be obtained.

Optionally, in an authentication manner, the gateway device compares the authentication information obtained from the transport layer packet header of the first negotiation packet with a control policy that is previously delivered by a controller and that corresponds to an authorized user, and determines whether an initiator (a user and a terminal device) of the first negotiation packet allows access to a requested service.

Optionally, each policy in the control policy corresponding to the authorized user includes a matching condition and a matching action, and the matching condition includes one or more of the following: a token of one authorized user, an identifier of an authorized terminal device, a token of an application that may be used by the authorized user, and address information of a server that the authorized user is allowed to access. The action includes one or more of the following: allowing to access, charging, traffic limiting, and the like.

Optionally, in another authentication manner, the gateway device sends, to the controller, the authentication information obtained from the transport layer packet header of the first negotiation packet, and receives an authentication result returned by the controller. The controller dynamically determines an authentication result according to a stored policy and other authentication-related information, for example, a network topology status and a status of each related resource (for example, a current operating status of the first server, and the like).

If it is determined, according to a control policy corresponding to the authorized user, that an initiator of the first negotiation packet is not allowed to access the requested service, it is determined that the authentication fails: or if it is determined, according to the control policy corresponding to the authorized user, that the initiator of the first negotiation packet is allowed to access the requested service, it is determined that the authentication succeeds.

If the first authentication succeeds, the gateway device performs step 123, step 125, and step 126.

Optionally, if the first authentication fails, the gateway device performs step 124.

Step 123: The gateway device skips performing tunnel decapsulation on the first negotiation packet, and forwards the first negotiation packet to the first server, to establish a first connection, where the first connection is a connection between the gateway device and the first server.

In this embodiment, skipping performing tunnel decapsulation on the first negotiation packet refers to skipping removing the tunnel packet header of the first negotiation packet, which is also referred to as "skipping tunnel decapsulation" or "skipping tunnel decapsulation".

Optionally, in embodiments of this application, the gateway device skips performing tunnel decapsulation on the first negotiation packet based on indication information carried in the first negotiation packet. For a function and a carrying manner of the indication information, refer to the description in step 702 in the related embodiment in FIG. 7. Details are not described herein again.

Optionally, the forwarding the first negotiation packet to the first server includes at least: The gateway device directly forwards the first negotiation packet to the first server: or the gateway device forwards the first negotiation packet whose authentication information has been deleted to the first server after deleting the authentication information from the first negotiation packet. Because the authentication information is carried in the transport layer packet header, tunnel decapsulation is not required when only the authentication information is deleted.

Still in an example in which the first negotiation packet is a Client Hello message, in step 123, the gateway device directly forwards the Client Hello message that carries the authentication information in the TLS option field to the first server, or removes the TLS option field from the Client Hello message, and sends the Client Hello message from which the TLS option field is removed to the first server.

Optionally, after step 123, in addition to establishing the first connection, the gateway device further establishes a connection between the gateway device and the first client proxy apparatus. In this embodiment, the connection between the gateway device and the first client proxy apparatus is referred to as a second connection for short. Step 125 and step 126 are performed.

Step 125: After the first authentication succeeds, successfully establish a second connection.

Step 126: The gateway device transmits a subsequent packet of the first session through the first connection and the second connection. The gateway device receives, through the second connection, a subsequent packet of the first session that is sent by the first client proxy apparatus, and forwards the subsequent packet of the first session from the first client proxy apparatus to the first server through the first connection: and receiving the subsequent packet of the first session from the first server through the first connection: and forwarding the subsequent packet of the first session from the first server to the first client proxy apparatus through the second connection.

Step 124: The gateway device terminates establishing the second connection. In other words, the gateway device closes a connection that is between the gateway device and the first client proxy apparatus and that is used to transmit the first negotiation packet.

In embodiments of this application, if the gateway device successfully authenticates the terminal device and the user based on the authentication information carried in the modified session negotiation packet, an additional encrypted tunnel does not need to be established between the first client proxy apparatus and the gateway device to transmit the subsequent service packet of the first session. This saves processing resources consumed by the terminal device and the gateway device for performing a tunnel encapsulation or decapsulation process and possibly involved encryption and decryption processing, reduces performance overheads of the terminal device and the gateway device, and helps improve overall performance of the access control system.

The gateway device relays and forwards a subsequent service packet of a session created between the first application client and the server. Optionally, the gateway device performs packet forwarding in a proxy mode. A principle of the proxy mode is basically similar to a principle of the proxy mode when the client proxy apparatus performs packet forwarding. For details, refer to related descriptions of the step 705 in the embodiment shown in FIG. 7, and details are not described herein again.

Figure 13:
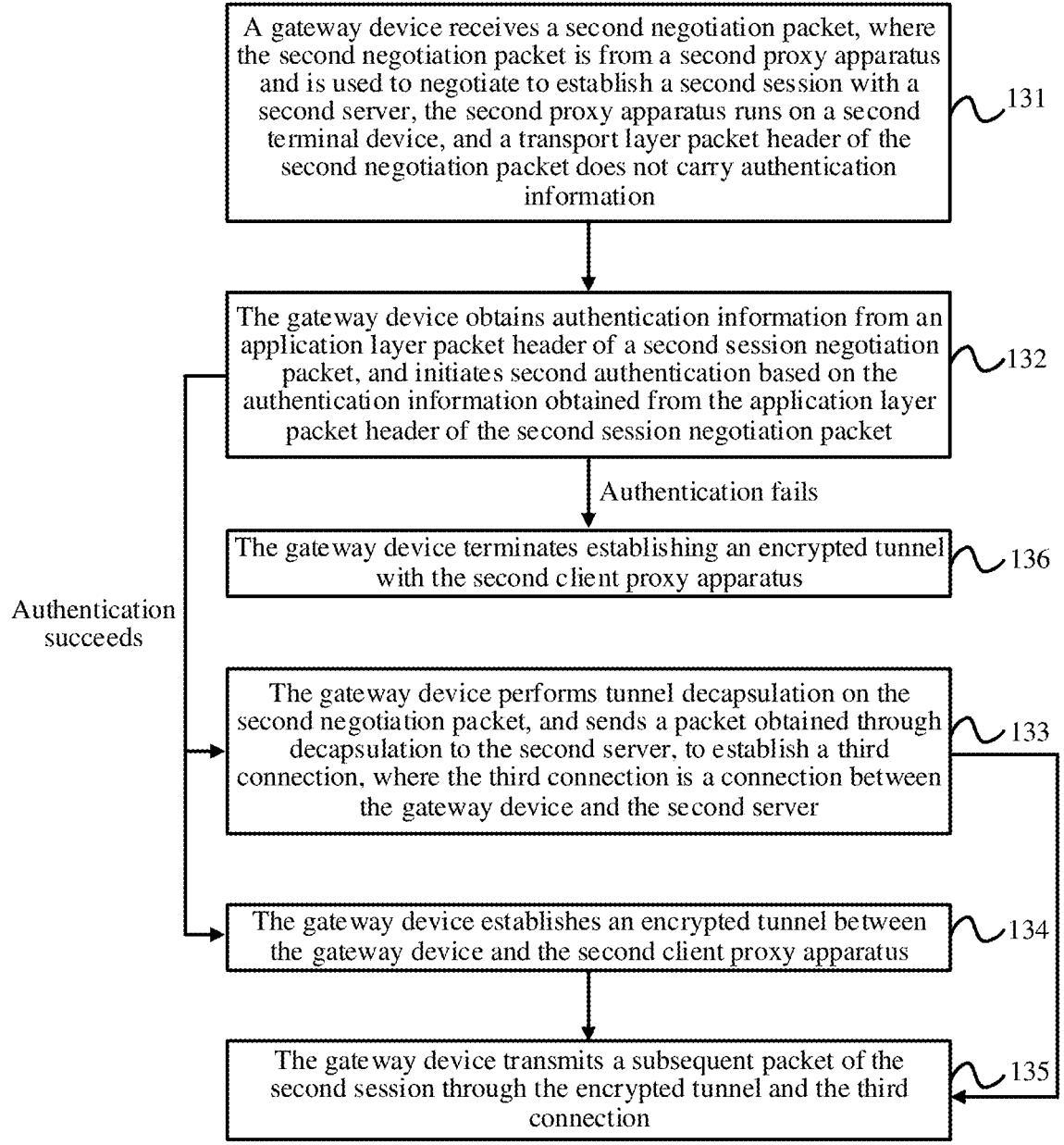
FIG. 13 is a flowchart of another access control method according to an embodiment of this application.

FIG. 13 is a flowchart of an access control method according to an embodiment of this application, including step 131 to step 135. FIG. 13 and FIG. 12 both describe the access control method provided in embodiments of this application from a perspective of a gateway device. A difference between FIG. 13 and FIG. 12 lies in that FIG. 12 describes an access control method when a transport layer packet header of a session negotiation packet carries authentication information, while FIG. 13 describes the access control method when the transport layer packet header of the session negotiation packet does not carry the authentication information, as an optional supplement to the embodiment described in FIG. 12.

Step 131: A gateway device receives a second negotiation packet, where the second negotiation packet is from a second client proxy apparatus and is used to perform negotiation to establish a second session with a second server. The second client proxy apparatus runs on a second terminal device, and a transport layer packet header of the second negotiation packet does not carry the authentication information.

Optionally, because a client proxy apparatus on one terminal device may complete a zero-trust-related function of a plurality of application clients running on the terminal, the second terminal device in FIG. 13 and the first terminal device in FIG. 12 may be a same terminal device or different terminal devices, and the second client proxy apparatus in FIG. 13 and the first client proxy apparatus in FIG. 12 may be a same client proxy apparatus or different client proxy apparatuses.

Optionally, the gateway device uses a method similar to a method in step 121 to determine that the transport layer packet header of the second negotiation packet does not carry the authentication information. The gateway device performs protocol parsing on the second negotiation packet, to determine whether the session negotiation packet is a predetermined protocol or a predetermined packet format. For example, when the second negotiation packet is a Client Hello message, the gateway device attempts to obtain the authentication information carried in the Client Hello message from a TLS option field of the Client Hello message. If the TLS option field does not exist in the Client Hello message, it is determined that the Client Hello message does not carry the authentication information.

If the transport layer packet header of the second negotiation packet does not carry the authentication information, it indicates that the client proxy apparatus fails to multiplex the session negotiation packet to transfer the authentication information. In this case, the session negotiation packet is actually a packet sent by the client proxy apparatus to initiate creation of an additional encrypted tunnel.

If the transport layer packet header of the second negotiation packet does not carry the authentication information, the gateway device performs step 132.

An implementation process of step 131 is basically similar to an implementation process of step 121, and an implementation process of step 132 is also similar to an implementation process of step 122. For similarities, refer to related descriptions of step 121 and step 122 in the foregoing embodiment, and details are not described herein again.

Step 132: The gateway device obtains authentication information from an application layer packet header of the second negotiation packet, and initiates second authentication based on the authentication information obtained from the application layer packet header of the second negotiation packet.

Optionally, in embodiments of this application, the application layer packet header includes but is not limited to an HTTP packet header. Certainly, the application layer packet header may also be a packet header of another encryption application.

An example in which the application layer packet header is the HTTPS packet header is used. When the client proxy apparatus carries address information of a real server in a Connect field of the HTTP packet header, and carries token information in a Cookie field, the gateway device uses data read from the Connect field and the Cookie field as the authentication information.

For details of the authentication process, refer to the description of step 122 in FIG. 12. Details are not described herein again.

If the first authentication process succeeds, the gateway device performs step 133, step 134, and step 135: and if the second authentication fails, the gateway device performs step 136.

Step 133: The gateway device performs tunnel decapsulation on the second negotiation packet, and sends a packet obtained through decapsulation to the second server, to establish a third connection, where the third connection is a connection between the gateway device and the second server.

Step 134: The gateway device establishes an encrypted tunnel between the gateway device and the second client proxy apparatus.

Step 135: The gateway device transmits a subsequent packet of the second session through the encrypted tunnel and the third connection.

The gateway device receives, through the encrypted tunnel, the subsequent packet of the second session that is subsequently sent by the second client proxy apparatus. The gateway device performs decapsulation on the received tunnel to obtain the subsequent packet of the second session from the second client proxy apparatus, and forwards the subsequent packet of the second session from the second client proxy apparatus to the second server through the third connection.

The gateway device receives the subsequent packet of the second session from the second server through the third connection, where the subsequent packet of the second session from the second server is in response to the subsequent packet of the second session from the second client proxy apparatus. After performing tunnel encapsulation on the subsequent packet of the second session from the second server, the gateway device sends a tunnel packet obtained through encapsulation to the second client proxy apparatus.

Step 136: The gateway device terminates establishing an encrypted tunnel with the second client proxy apparatus.

According to the access control method provided in embodiments of this application, when failing to obtain the authentication information from the packet header of the session negotiation packet, the gateway device obtains the authentication information from the application layer packet header of the session negotiation packet that is actually served as the tunnel negotiation packet. When the authentication succeeds, the gateway device transmits a service packet in a plaintext form between the application client and the server through an encrypted tunnel that is additionally established between the gateway device and the client proxy apparatus, to ensure that a link security requirement is met.

Figure 14:
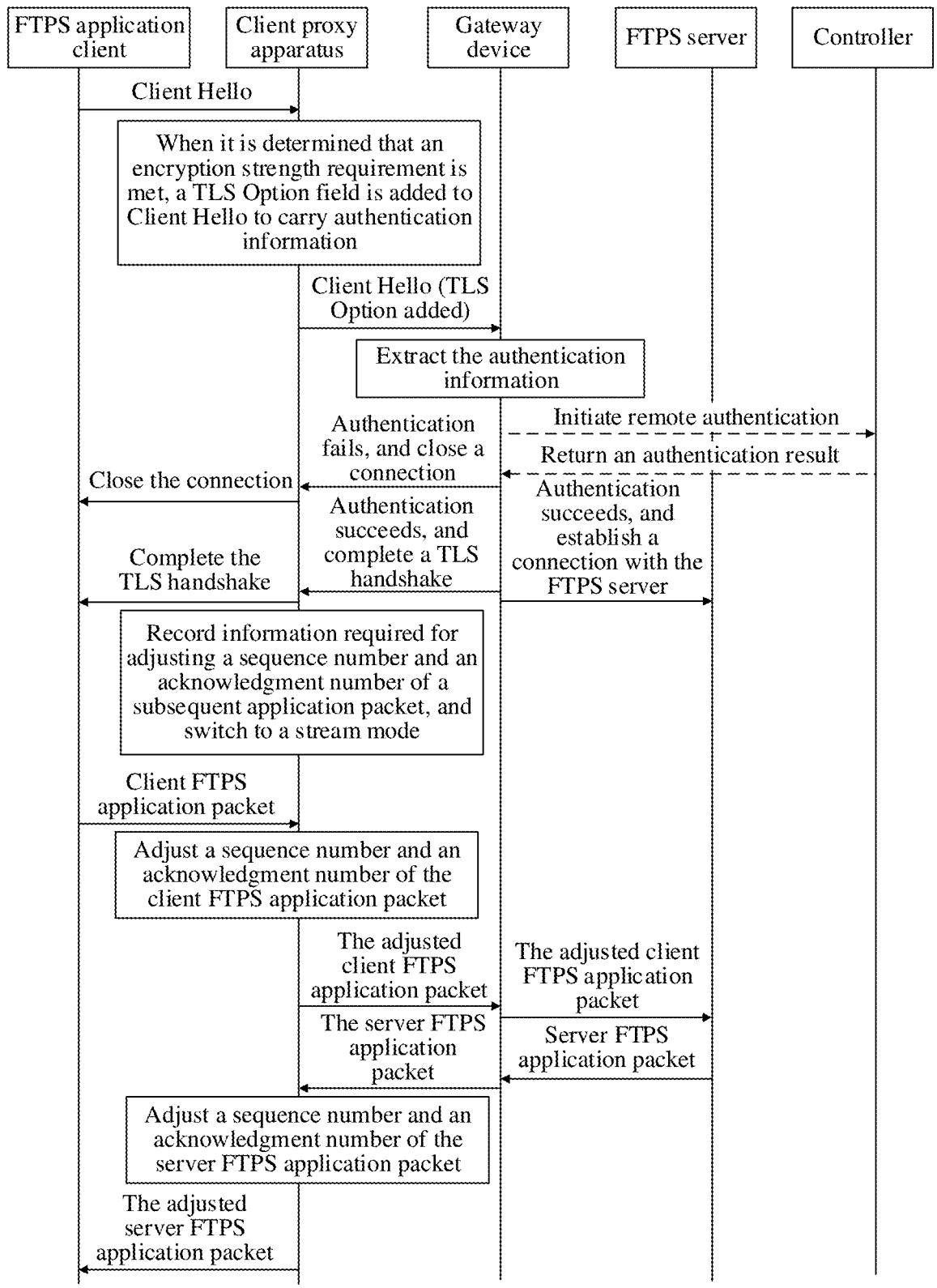
FIG. 14 is a schematic diagram of an access control method according to an embodiment of this application.

FIG. 14 is a schematic diagram of an access control method according to an embodiment of this application. FIG. 14 describes an interaction process between an application client, a client proxy apparatus, a gateway device, a server, and a controller in a manner of a sequence diagram when a to-be-created session meets an encryption strength requirement. FIG. 14, FIG. 7, and FIG. 12 separately describe, from different perspectives, an access control method in a same scenario (e.g., a case that the to-be-created session meets the encryption strength requirement). These embodiments may be mutually referenced, and similar details are not described in detail.

As shown in FIG. 14, an FTPS client on a terminal device initiates session creation to an FTPS server. The session negotiation packet sent by the FTPS client is a Client Hello message. When the client proxy apparatus on the same terminal device determines, based on information related to encryption strength carried in the Client Hello message, such as a protocol version number and/or a cipher suite identifier list, that the negotiated session meets the encryption strength requirement, a TLS option field is newly added to the Client Hello message, and the TLS option field carries authentication information. The client proxy apparatus sends the Client Hello message that carries the authentication information in the TLS option field to the gateway device.

The gateway device performs parsing on the received Client Hello message, extracts the authentication information from the TLS option field, and interacts with a controller based on the authentication information to complete authentication. If the authentication fails, the gateway device terminates establishing a connection to the client proxy apparatus. The client proxy apparatus then closes a connection to the FTPS client. If the authentication succeeds, the gateway device establishes a connection to the FTPS server and completes a TLS handshake with the client proxy apparatus, and then the client proxy apparatus completes the TLS handshake with the FTPS client. The client proxy apparatus records information required for adjusting a sequence number and an acknowledgment number of a subsequent service packet, and switches from a proxy mode to a stream mode.

The client proxy apparatus intercepts an FTPS service packet (referred to as a "client FTPS service packet" for short) sent by the FTPS client, adjusts a sequence number and an acknowledgment number of the client FTPS service packet to obtain an adjusted client FTPS service packet, and sends the adjusted client FTPS service packet to the gateway device. The gateway device forwards the adjusted client FTPS service packet to the FTPS server.

The client proxy apparatus receives an FTPS service packet (referred to as a "server FTPS service packet" for short) that is responded by the FTPS server and that is forwarded by the gateway device, adjusts the sequence number and the acknowledgment number of the FTPS service packet of the server, to obtain the adjusted FTPS service packet of the FTPS server, and sends the adjusted FTPS service packet of the FTPS server to the FTPS client.

Figure 15:
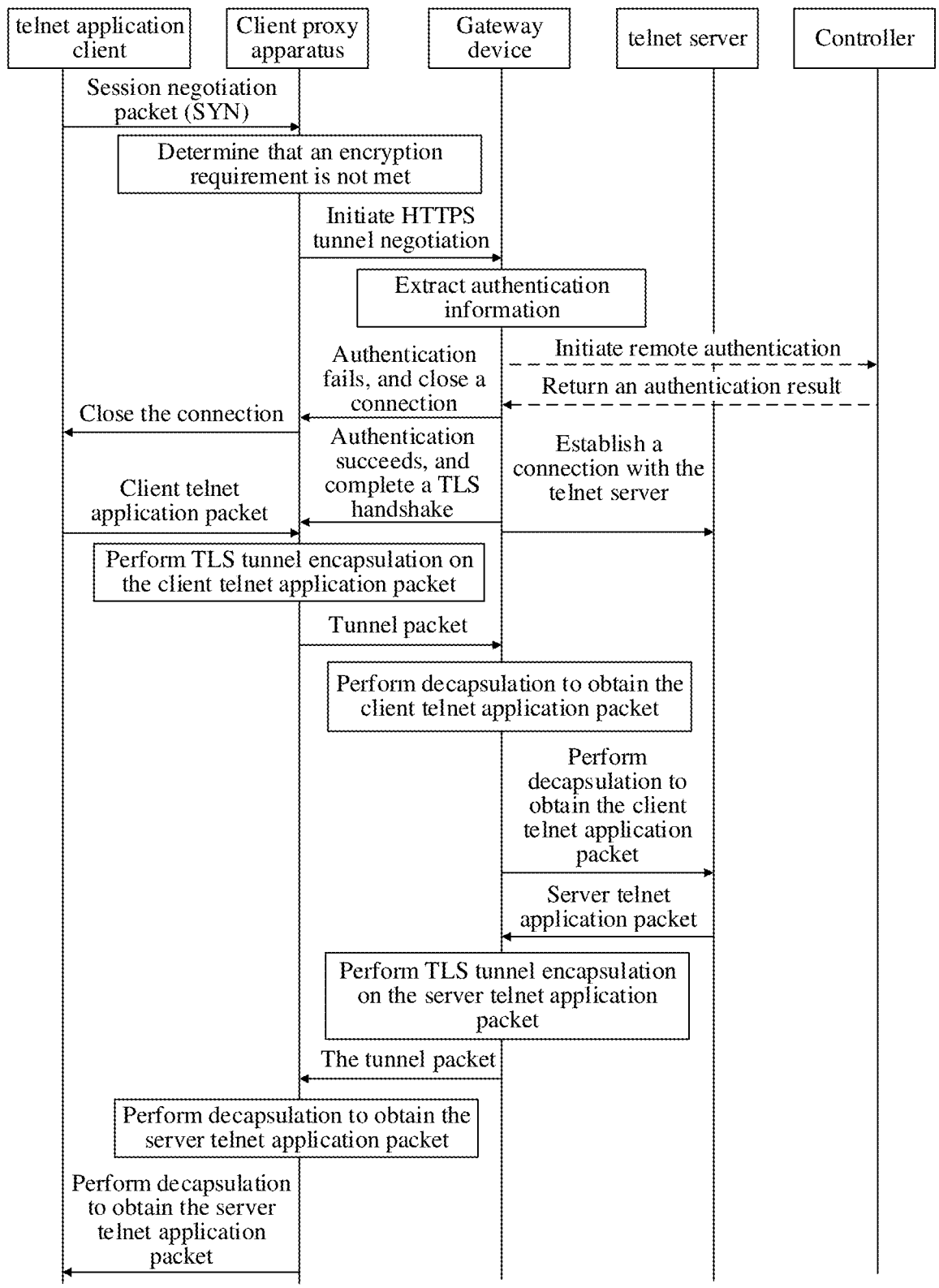
FIG. 15 is a schematic diagram of an access control method according to an embodiment of this application.

FIG. 15 is a schematic diagram of an access control method according to an embodiment of this application. FIG. 15 describes an interaction process between an application client, a client proxy apparatus, a gateway device, a server, and a controller in a manner of a sequence diagram when a to-be-created session does not meet an encryption strength requirement. FIG. 15, FIG. 11, and FIG. 13 separately describe, from different perspectives, an access control method in a same scenario (e.g., a case that the to-be-created session does not meet the encryption strength requirement). Therefore, these embodiments may be mutually referenced, and similar details are not described in detail.

As shown in FIG. 15, a telnet client on a terminal device initiates session creation to a telnet server. A session negotiation packet sent by the telnet client is an SYN packet. The client proxy apparatus on the same terminal device determines, based on the session negotiation packet, that the to-be-created session is a non-encrypted application and does not meet an encryption requirement. The client proxy apparatus performs tunnel negotiation with the gateway device, and negotiates to establish an HTTPS tunnel, to encrypt a service packet to ensure link security. The client proxy apparatus carries authentication information in a Connect field and a cookie field of a tunnel negotiation packet HTTP header (as shown in FIG. 5).

The gateway device performs parsing on the received tunnel negotiation packet, extracts the authentication information from the Connect field and the cookie field of the tunnel negotiation packet, and interacts with a controller based on the authentication information, to complete an authentication process. If the authentication fails, the gateway device terminates establishing a connection to the client proxy apparatus. The client proxy apparatus then closes a connection to the telnet client. If the authentication succeeds, the gateway device establishes a connection to the telnet server, and the gateway device completes a tunnel establishment process with the client proxy apparatus.

The client proxy apparatus intercepts a telnet service packet (referred to as a "client telnet service packet" for short) sent by the telnet client, performs HTTPS tunnel encapsulation on the client telnet service packet, and then sends the tunnel packet obtained through encapsulation to the gateway device.

The gateway device receives, through an HTTPS encrypted tunnel, the tunnel packet sent by the client proxy apparatus, performs decapsulation on the received tunnel packet to obtain the client telnet service packet, and forwards the client telnet service packet obtained through decapsulation to the telnet server.

The gateway device receives the telnet service packet (referred to as a "server telnet service packet" for short) from the telnet server, where the server telnet service packet is in response to the client telnet service packet. After performing tunnel encapsulation on the server telnet service packet, the gateway device sends the tunnel packet obtained through encapsulation to a telnet client proxy apparatus.

The client proxy apparatus receives the tunnel packet from the gateway device through the encrypted tunnel, and performs decapsulation on the received tunnel packet to obtain the server telnet service packet. The client proxy sends the server telnet service packet obtained through decapsulation to the telnet client.

Figure 16:
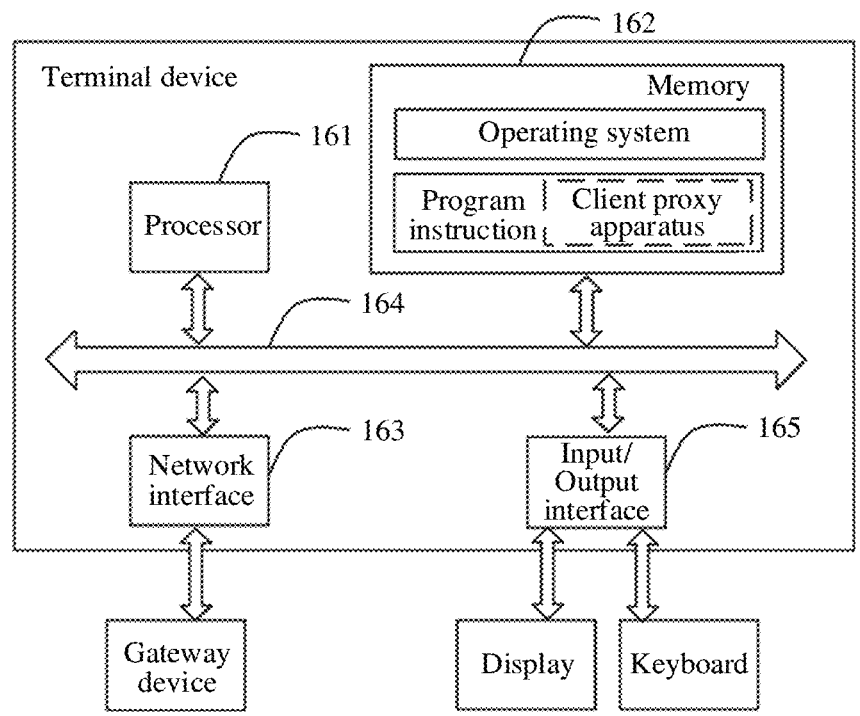
FIG. 16 is a schematic diagram of a structure of a terminal device according to an embodiment of this application.

FIG. 16 is a schematic diagram of a structure of a terminal device according to an embodiment of this application. The terminal device shown in FIG. 16 includes a memory 162 and at least one processor 161.

Optionally, the processor 161 implements the method in the foregoing embodiment by reading instructions stored in the memory 162 to generate the client proxy apparatus, or the processor 161 may implement the method in the foregoing embodiment by generating the client proxy apparatus through instructions stored in the memory 162. When the processor 161 implements the method in the foregoing embodiment by reading the instructions stored in the memory 162, the memory 162 stores the instructions for implementing the client proxy apparatus in the foregoing embodiment of this application.

The client proxy apparatus generated by the terminal device with the structure shown in FIG. 16 implements functions of the client proxy apparatus in the solution described in the foregoing embodiment. For the session that is initiated by the application client in the terminal device in FIG. 16 and meets an encryption strength requirement, before forwarding a session negotiation packet to the gateway device, the client proxy apparatus carries the authentication information in the transport layer packet header of the session negotiation packet, and the client proxy apparatus does not need to further perform encrypted tunnel encapsulation. This reduces overheads caused by additional encryption and decryption of a tunnel. Optionally, the client proxy apparatus performs functions of the client proxy apparatus described in the embodiments related to FIG. 6, FIG. 7, FIG. 9, FIG. 10, FIG. 11, FIG. 14, or FIG. 15, and cooperates with the gateway device, to reduce performance overheads of the terminal device and the gateway device in an access control process.

The memory 162 includes but is not limited to a random access memory (RAM), a read-only memory (ROM), an erasable programmable read-only memory (EPROM), a flash memory, an optical memory, or the like. The memory 162 stores code of an operating system.

After the program instructions stored in the memory 162 are read by the at least one processor 161, the client proxy apparatus generated by the terminal device performs the following operations:
intercepting a first negotiation packet, where the first negotiation packet is from a first application client on the terminal device and is used to perform negotiation to establish a first session, the first session is a session between the first application client and a first server, and the first session meets an encryption strength requirement;
adding authentication information corresponding to the first application client to a transport layer packet header of the first negotiation packet, to obtain a modified first negotiation packet: and sending the modified first negotiation packet to a gateway device.

Optionally, for a detailed process in which the client proxy apparatus adds authentication information corresponding to the first application client to a transport layer packet header of the first negotiation packet, to obtain a modified first negotiation packet, refer to the description of the related embodiments in FIG. 7, FIG. 8, FIG. 9, and FIG. 10 for the detailed process of sending the modified first negotiation packet to the gateway device, and details are not described herein again.

Optionally, for a case that a session that is initiated by an application client in the terminal device and does not meet an encryption strength requirement, and for a process of processing a session negotiation packet by the terminal device, refer to the foregoing FIG. 11 and the description of the related embodiment, and details are not described herein again.

Optionally, the terminal device shown in FIG. 16 further includes a network interface 163. The network interface 163 may be a wired interface, for example, a fiber distributed data interface (FDDI) or a gigabit Ethernet (GE) interface. Alternatively, the network interface 163 may be a wireless interface. The network interface 163 is configured to send a packet to the gateway device or receive a packet sent by the gateway device in the embodiment shown in FIG. 6, 7, 8, 9, 10, or FIG. 11.

Optionally, the terminal device shown in FIG. 16 further includes a bus 164. The processor 161 and the memory 162 are usually connected to each other through the bus 164, or may be connected to each other in another manner.

Optionally, the protection system further includes an input/output interface 165. The input/output interface 165 is configured to connect to an input device, and receive identity information that is input by a user through the input device. The input device includes, but is not limited to, a keyboard, a touchscreen, a microphone, and the like. The input/output interface 165 is further configured to be connected to an output device, and output access control-related logs or statistical information of the processor 161, for example, applications for which user authentication fails or applications for which user authentication succeeds. The output device includes, but is not limited to, a display, a printer, and the like.

After intercepting the session negotiation packet of the session that meets the encryption strength requirement and is initiated by the application client, the client proxy apparatus in the terminal device provided in embodiments of this application adds the authentication information to the transport layer packet header of the session negotiation packet to obtain the modified session negotiation packet, and sends the modified session negotiation packet to the gateway device, so that the gateway device authenticates the terminal device and the user based on the authentication information carried in the transport layer packet header of the session negotiation packet. In this way, an original session negotiation packet of the application client is multiplexed between the client proxy apparatus and the gateway device to implement an objective of transferring the authentication information. In this way, on the premise of ensuring connection security and transferring the authentication information, the client proxy apparatus and the gateway device do not need to establish an additional encrypted tunnel. This saves processing resources consumed for performing additional tunnel negotiation on the terminal device and the gateway device, and helps reduce performance overheads of the terminal device and the gateway device.

Figure 17:
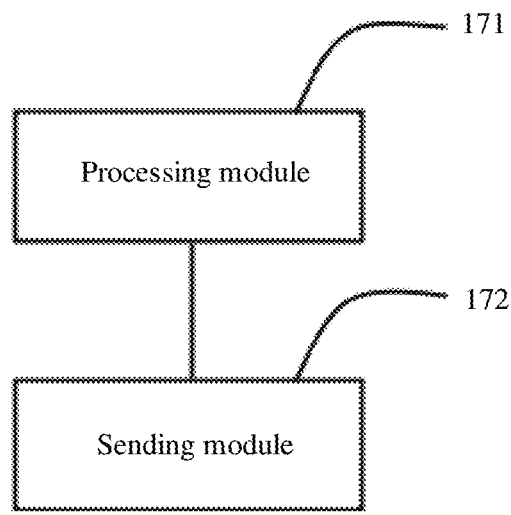
FIG. 17 is another schematic diagram of a structure of a terminal device according to an embodiment of this application.

FIG. 17 is a schematic diagram of a structure of a client proxy apparatus according to an embodiment of this application. The client proxy apparatus having the structure shown in FIG. 17 implements functions of the client proxy apparatus in the solution described in the foregoing embodiment. For a session that is initiated by an application client in a terminal device in which the client proxy apparatus shown in FIG. 17 is located and meets an encryption strength requirement, before forwarding a session negotiation packet to a gateway device, the client proxy apparatus carries authentication information in a transport layer packet header of the session negotiation packet, and the client proxy apparatus does not need to further perform encrypted tunnel encapsulation. This reduces overheads caused by additional encryption and decryption of a tunnel. Optionally, the client proxy apparatus performs functions of the client proxy apparatus described in the embodiments related to FIG. 6, FIG. 7, FIG. 9, FIG. 10, FIG. 11, FIG. 14, or FIG. 15, and cooperates with the gateway device, so that performance overheads of the terminal device and the gateway device in an access control process may be reduced.

The client proxy apparatus includes a processing module 171 and a sending module 172.

The processing module 171 is configured to intercept a first negotiation packet, where the first negotiation packet is from a first application client on the terminal device and is used to perform negotiation to establish a first session, the first session is a session between the first application client and a first server, and the first session meets an encryption strength requirement; and add authentication information corresponding to the first application client to a transport layer packet header of the first negotiation packet, to obtain a modified first negotiation packet.

The sending module 172 is configured to send the modified first negotiation packet to a gateway device.

For a detailed process in which the processing module 171 adds authentication information corresponding to the first application client to the transport layer packet header of the first negotiation packet, to obtain the modified first negotiation packet, refer to the description of the related embodiments in FIG. 7, FIG. 8, FIG. 9, FIG. 10, and FIG. 14, for the detailed process of sending the modified first negotiation packet to the gateway device, and details are not described herein again.

Optionally, the sending module 172 is further configured to: after the first session is successfully established, transmit a subsequent packet of the first session in a stream mode.

Optionally, the processing module 171 is further configured to intercept a second negotiation packet, where the second negotiation packet is from a second application client on the terminal device and is used to negotiate with a second server to establish a second session, and the second session does not meet the encryption strength requirement: and perform tunnel encapsulation on the second negotiation packet to obtain a tunnel negotiation packet, where a packet header of the tunnel negotiation packet includes authentication information corresponding to the second application client, and the tunnel negotiation packet is used to perform negotiation to establish an encrypted tunnel between the client proxy apparatus and the gateway device.

Correspondingly, the sending module 172 is further configured to send the tunnel negotiation packet to the gateway device.

Optionally, for a case that a session that is initiated by an application client in the terminal device and does not meet an encryption strength requirement, and for more detailed processes of processing a session negotiation packet by the terminal device, refer to the foregoing FIG. 11 and FIG. 15 and the description of the related embodiment, and details are not described herein again.

Figure 18:
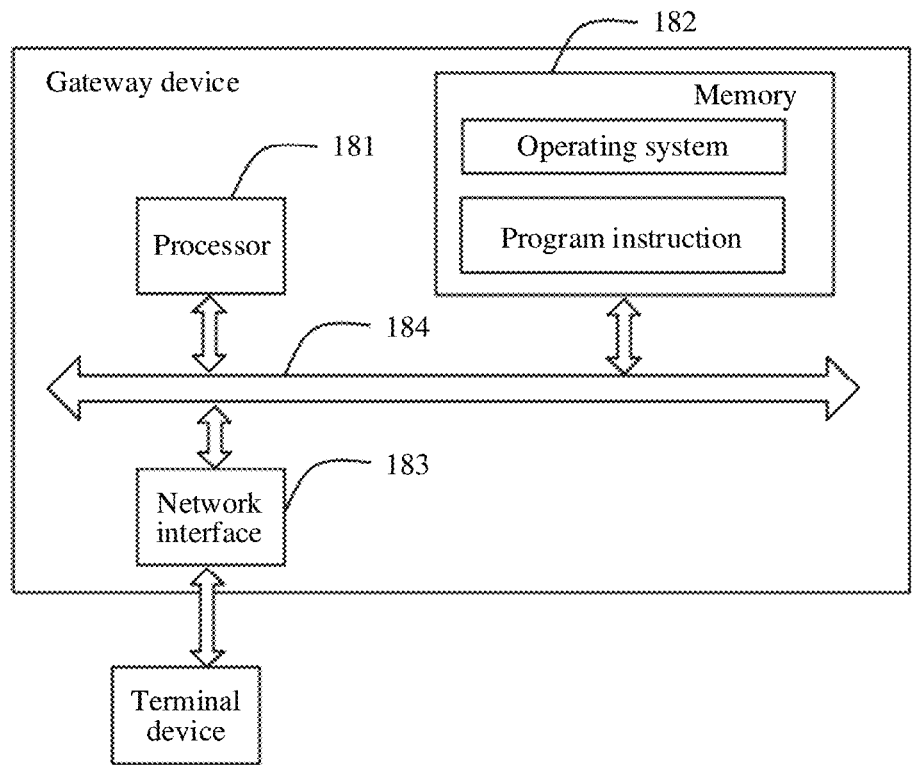
FIG. 18 is a schematic diagram of a structure of a gateway device according to an embodiment of this application.

FIG. 18 is a schematic diagram of a structure of a gateway device according to an embodiment of this application. The gateway device having the structure shown in FIG. 18 implements functions of the gateway device in the solution described in the foregoing embodiment. Optionally, the gateway device shown in FIG. 18 performs a function of the gateway device described in any one of the embodiments shown in FIG. 6, FIG. 12, FIG. 13, FIG. 14, or FIG. 15, and cooperates with the client proxy apparatus, so that performance overheads of the terminal device and the gateway device in an access control process may be reduced.

The gateway device shown in FIG. 18 includes a memory 182 and at least one processor 181.

Optionally, the processor 181 implements the method in the foregoing embodiment by reading instructions stored in the memory 182, or the processor 181 may implement the method in the foregoing embodiment through instructions stored in the processor 181. When the processor 181 implements the method in the foregoing embodiment by reading the instructions stored in the memory 182, the memory 182 stores the instructions for implementing the method provided in the foregoing embodiment of this application.

Optionally, the at least one processor 181 is one or more CPUs, or a single-core CPU, or may be a multi-core CPU.

The memory 182 includes but is not limited to a RAM, a ROM, an EPROM, a flash memory, an optical memory, or the like. The memory 182 stores instructions of an operating system.

After the program instructions stored in the memory 182 are read by the at least one processor 181, the gateway device performs the following operations:

receiving a first negotiation packet, where the first negotiation packet is from a first client proxy apparatus and is used to perform negotiation to establish a first session, the first session is a session between a first terminal device and a first server, the first client proxy apparatus runs on the first terminal device, and a transport layer packet header of the first negotiation packet carries authentication information;

initiating first authentication based on the authentication information: and after the first authentication succeeds, skipping performing tunnel decapsulation on the first negotiation packet, and forwarding the first negotiation packet to the first server, to establish a first connection, where the first connection is a connection between the gateway device and the first server.

Optionally, for a detailed process in which the gateway device obtains the authentication information carried in the transport layer packet header of the first negotiation packet, refer to the description of the related embodiment in FIG. 12. Details are not described herein again.

Optionally, for a process of processing the session negotiation packet that is sent by the terminal device and received by the gateway device and in which the transport layer packet header does not carry the authentication information, refer to the foregoing FIG. 13 and the description of the related embodiments, and details are not described herein again.

Optionally, the gateway device shown in FIG. 18 further includes a network interface 183. The network interface 183 may be a wired interface, for example, an FDDI or a GE interface. The network interface 183 may also be a wireless interface. The network interface 183 is configured to: in the embodiments shown in FIG. 6, FIG. 12, FIG. 13, FIG. 14, or FIG. 15, receive a packet sent by a client proxy apparatus, or send a packet to a client proxy apparatus, or receive a packet sent by a server, or send a packet to a server.

After the processor 181 reads the program instructions in the memory 182, for other functions that may be performed by the gateway device, refer to the descriptions in the foregoing method embodiments.

Optionally, the terminal device shown in FIG. 18 further includes a bus 184. The processor 181 and the memory 182 are usually connected to each other through the bus 184, or may be connected to each other in another manner.

If the gateway device provided in embodiments of this application successfully authenticates the terminal device and the user based on the authentication information carried in the received session negotiation packet, an additional encrypted tunnel does not need to be established between the client proxy apparatus and the gateway device to transmit the subsequent service packet of the session between the application client and the server that is created by using the session negotiation packet. This saves processing resources consumed by the terminal device and the gateway device for performing a tunnel encapsulation or decapsulation process and possibly involved encryption and decryption processing, reduces performance overheads of the terminal device and the gateway device, and helps improve overall performance of the access control system.

Figure 19:
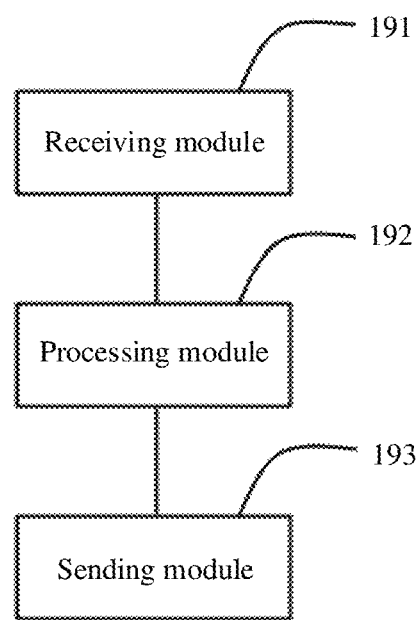
FIG. 19 is a schematic diagram of a structure of another gateway device according to an embodiment of this application.

FIG. 19 is a schematic diagram of a structure of a gateway device according to an embodiment of this application. The gateway device having the structure shown in FIG. 19 implements functions of the gateway device in the solution described in the foregoing embodiment. Optionally, the gateway device shown in FIG. 19 performs a function of the gateway device described in any one of the embodiments shown in FIG. 6, FIG. 12, FIG. 13, FIG. 14, or FIG. 15, and cooperates with the client proxy apparatus, so that performance overheads of the terminal device and the gateway device in an access control process may be reduced.

The gateway device includes a receiving module 191, a processing module 192, and a sending module 193.

The receiving module 191 is configured to receive a first negotiation packet, where the first negotiation packet is from a first client proxy apparatus and is used to perform negotiation to establish a first session, the first session is a session between a first terminal device and a first server, the first client proxy apparatus runs on the first terminal device, and a transport layer packet header of the first negotiation packet carries authentication information:

the processing module 192 is configured to initiate first authentication based on the authentication information: and the sending module 193 is configured to: after the first authentication succeeds, skip performing tunnel decapsulation on the first negotiation packet, and forward the first negotiation packet to the first server, to establish a first connection, where the first connection is a connection between the gateway device and the first server.

Optionally, for a detailed process in which the gateway device obtains the authentication information carried in the transport layer packet header of the first negotiation packet, refer to the description of the related embodiment in FIG. 12. Details are not described herein again.

Optionally, the processing module 192 is further configured to: after the first authentication succeeds, establish a second connection, where the second connection is a connection between the gateway device and the first client proxy apparatus:

the receiving module 191 is further configured to receive, through the second connection, a subsequent packet of the first session sent by the first client proxy apparatus;

the sending module 193 is further configured to forward the subsequent packet of the first session from the first client proxy apparatus to the first server through the first connection;

the receiving module 191 is further configured to receive the subsequent packet of the first session from the first server through the first connection: and the sending module 193 is further configured to forward the subsequent packet of the first session from the first server to the first client proxy apparatus.

Optionally, for a process of processing the session negotiation packet that is sent by the terminal device and received by the gateway device and in which the transport layer packet header does not carry the authentication information, refer to the foregoing FIG. 13 and the description of the related embodiments, and details are not described herein again.

For other functions that may be performed by the gateway device shown in FIG. 19, refer to the descriptions in the foregoing method embodiments.

If the gateway device provided in embodiments of this application successfully authenticates the terminal device and the user based on the authentication information carried in the received session negotiation packet, an additional encrypted tunnel does not need to be established between the client proxy apparatus and the gateway device to transmit the subsequent service packet of the session between the application client and the server that is created by using the session negotiation packet. This saves processing resources consumed by the terminal device and the gateway device for performing a tunnel encapsulation or decapsulation process and possibly involved encryption and decryption processing, reduces performance overheads of the terminal device and the gateway device, and helps improve overall performance of the access control system.

The apparatus embodiment described in FIG. 17 or FIG. 19 is merely an example. For example, the module division is merely logical function division and there may be other division manners in an actual implementation. For example, a plurality of modules or components may be combined or integrated into another system, or some features may be ignored or not performed. Functional modules in embodiments of this application may be integrated into one processing module, or each module may exist alone physically, or two or more modules may be integrated into one module.

For example, the modules in FIG. 19 may be implemented in a form of hardware, or may be implemented in a form of a software functional unit. For example, when software is used for implementation, the processing module 192 may be implemented by a software functional module generated after the at least one processor 181 in FIG. 18 reads the program code stored in the memory. Alternatively, the foregoing modules in FIG. 19 may be separately implemented by different hardware in the gateway device. For example, the processing module 192 is implemented by a part of processing resources (for example, one core in a multi-core processor) in at least one processor 181 in FIG. 18, and the sending module 193 and the receiving module 191 are implemented by a network interface 183 in FIG. 18 and remaining processing resources (for example, another core in the multi-core processor) in at least one processor 181 in FIG. 18, or are implemented by using a programmable device such as an FPGA or a coprocessor. It is obvious that the foregoing functional module may be alternatively implemented by using a combination of software and hardware. For example, the receiving module 191 and the sending module 193 are implemented by using a hardware programmable device, and the processing module 192 is implemented by a software functional module generated after a CPU reads the program code stored in the memory.

Embodiments of this application further provide an access control system, including at least one terminal device (as shown in FIG. 16 or FIG. 17) and a gateway device (as shown in FIG. 18 or FIG. 19). For a schematic diagram of the access control system, refer to FIG. 6, FIG. 14, or FIG. 15.

Embodiments in this specification are all described in a progressive manner, for same or similar parts in embodiments, reference may be made to these embodiments, and each embodiment focuses on a difference from other embodiments. Especially, a system embodiment is basically similar to a method embodiment, and therefore is described briefly: for related parts, reference may be made to partial descriptions in the method embodiment.

A person of ordinary skill in the art may understand that each aspect of this application or a possible implementation of each aspect may be implemented as a computer program product. The computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any proper combination thereof. For example, the computer-readable storage medium is a random access memory (RAM), a read-only memory (ROM), an erasable programmable read-only memory (EPROM), or a portable read-only memory (CD-ROM).

It is clear that a person skilled in the art may make various modifications and variations to the various embodiments without departing from the scope of the present disclosure. The present disclosure is intended to cover these modifications and variations provided that they fall within the scope of protection defined by the following claims.

What is claimed is:

1. An access control method, performed by a client proxy apparatus running on a terminal device, the method comprising:

intercepting a first negotiation packet, wherein the first negotiation packet is a transport layer security (TLS) packet, the first negotiation packet is from a first application client on the terminal device and is used to perform negotiation to establish a first session, the first session is between the first application client and a first server, and the first session meets an encryption strength requirement;

adding authentication information corresponding to the first application client to a transport layer packet header of the first negotiation packet to obtain a modified first negotiation packet; and sending the modified first negotiation packet to a gateway device, wherein the adding authentication information corresponding to the first application client to the transport layer packet header of the first negotiation packet comprises:

adding a TLS option field to the transport layer packet header of the first negotiation packet; and causing the authentication information corresponding to the first application client to be included in the TLS option field.

2. The access control method according to claim 1, wherein the first session is determined to meet the encryption strength requirement in response to determining the first negotiation packet carries a specified protocol version number, wherein transmission security of implementation of a protocol version corresponding to the specified protocol version number is higher than a preset security standard, and data transmission is performed by using the first session based on the protocol version.

3. The access control method according to claim 2, wherein the specified protocol version number comprises transport layer security (TLS) 1.2 or TLS 1.3.

4. The access control method according to claim 1, wherein the first session is determined to meet the encryption strength requirement in response to determining the first negotiation packet comprises a specified cipher suite identifier, wherein the specified cipher suite identifier identifies a specified cipher suite, transmission security implemented by the specified cipher suite is higher than a preset security standard, and application data in the first session is encrypted based on the specified cipher suite.

5. The access control method according to claim 1, wherein the first negotiation packet is a client hello message.

6. The access control method according to claim 1, wherein a transport layer packet header of the modified first negotiation packet comprises indication information, and the indication information enables the gateway device to skip performing decapsulation on the modified first negotiation packet.

7. The access control method according to claim 1, wherein the TLS option field conforms to a type-length-value (TLV) structure, a type T field in the TLV structure is used to carry indication information, the indication information is used to enable the gateway device to skip performing TLS decapsulation processing on the modified first negotiation.

8. The access control method according to claim 1, wherein the authentication information comprises one or more of a user token or an application token.

9. The access control method according to claim 1, wherein after the sending the modified first negotiation packet to the gateway device, the method further comprises:

after the first session is successfully established, transmitting a subsequent packet of the first session in a stream mode.

10. The access control method according to claim 1, further comprising:
- intercepting a second negotiation packet, wherein the second negotiation packet is from a second application client on the terminal device and is used to negotiate with a second server to establish a second session, and the second session does not meet the encryption strength requirement;
- performing tunnel encapsulation on the second negotiation packet to obtain a tunnel negotiation packet, wherein a packet header of the tunnel negotiation packet comprises authentication information corresponding to the second application client, and the tunnel negotiation packet is used to perform negotiation to establish an encrypted tunnel between the client proxy apparatus and the gateway device; and
- sending the tunnel negotiation packet to the gateway device.

11. An access control method, performed by a gateway device, the method comprising:
- receiving a first negotiation packet, wherein the first negotiation packet is a transport layer security TLS) packet, the first negotiation packet is from a first client proxy apparatus and is used to perform negotiation to establish a first session, the first session is between a first terminal device and a first server, the first client proxy apparatus runs on the first terminal device, and a transport layer packet header of the first negotiation packet carries authentication information in a TLS option field of the transport layer packet header;
- initiating first authentication based on the authentication information; and
- after the first authentication succeeds, skipping performing tunnel decapsulation on the first negotiation packet, and forwarding the first negotiation packet to the first server, to establish a first connection, wherein the first connection is between the gateway device and the first server.

12. The access control method according to claim 11, wherein the first negotiation packet is a client hello message.

13. The access control method according to claim 12, wherein the TLS option field conforms to a type-length-value (TLV) structure, a type T field in the TLV structure is used to carry indication information, the gateway device skips performing TLS decapsulation on a modified first negotiation packet based on the indication information, and a value V field is used to carry the authentication information.

14. The access control method according to claim 11, wherein the transport layer packet header further carries indication information, and the indication information enables the gateway device to skip performing the tunnel decapsulation on the first negotiation packet.

15. A terminal device, comprising:
- a processor; and
- a non-transitory memory having instructions stored thereon that, when executed by the processor, cause the terminal device to:
- intercept a first negotiation packet, wherein the first negotiation packet is a transport layer security TLS) packet, the first negotiation packet is from a first application client on the terminal device and is used to perform negotiation to establish a first session, the first session is between the first application client and a first server, and the first session meets an encryption strength requirement;
- add authentication information corresponding to the first application client to a transport layer packet header of the first negotiation packet to obtain a modified first negotiation packet; and
- send the modified first negotiation packet to a gateway device,
- wherein the terminal device adds authentication information corresponding to the first application client to the transport layer packet header of the first negotiation packet by:
  - adding a TLS option field to the transport layer packet header of the first negotiation packet; and
  - causing the authentication information corresponding to the first application client to be included in the TLS option field.

16. The terminal device according to claim 15, wherein the first session is determined to meet the encryption strength requirement in response to determining the first negotiation packet carries a specified protocol version number, wherein transmission security of implementation of a protocol version corresponding to the specified protocol version number is higher than a preset security standard, and data transmission is performed by using the first session based on the protocol version.

17. The terminal device according to claim 16, wherein the specified protocol version number comprises transport layer security (TLS) 1.2 or TLS 1.3.

18. The terminal device according to claim 15, wherein the first session is determined to meet the encryption strength requirement in response to determining the first negotiation packet comprises a specified cipher suite identifier, wherein the specified cipher suite identifier identifies a specified cipher suite, transmission security implemented by the specified cipher suite is higher than a preset security standard, and application data in the first session is encrypted based on the specified cipher suite.

19. The terminal device according to claim 15, wherein the first negotiation packet is a client hello message.

20. The terminal device according to claim 15, wherein a transport layer packet header of the modified first negotiation packet comprises indication information, and the indication information enables the gateway device to skip performing decapsulation on the modified first negotiation packet.

21. The terminal device according to claim 15, wherein the terminal device is further caused to:
- after the first session is successfully established, transmit a subsequent packet of the first session in a stream mode.

22. The terminal device according to claim 15, wherein the terminal device is further caused to:
- intercept a second negotiation packet, wherein the second negotiation packet is from a second application client on the terminal device and is used to negotiate with a second server to establish a second session, and the second session does not meet the encryption strength requirement;
- perform tunnel encapsulation on the second negotiation packet to obtain a tunnel negotiation packet, wherein a packet header of the tunnel negotiation packet comprises authentication information corresponding to the second application client, and the tunnel negotiation packet is used to perform negotiation to establish an encrypted tunnel between a client proxy apparatus and the gateway device; and
- send the tunnel negotiation packet to the gateway device.

23. A gateway device, comprising:
a processor; and
a non-transitory having instructions stored thereon that, when executed by the processor, cause the gateway device to:
receive a first negotiation packet, wherein the first negotiation packet is a transport layer security (TLS) packet, the first negotiation packet is from a first client proxy apparatus and is used to perform negotiation to establish a first session, the first session is between a first terminal device and a first server, the first client proxy apparatus runs on the first terminal device, and a transport layer packet header of the first negotiation packet carries authentication information in a TLS option field of the transport layer packet header;
initiate first authentication based on the authentication information; and
after the first authentication succeeds, skip performing tunnel decapsulation on the first negotiation packet, and forward the first negotiation packet to the first server, to establish a first connection, wherein the first connection is between the gateway device and the first server.

24. The gateway device according to claim 23, wherein the first negotiation packet is a Client Hello message.

\* \* \* \* \*